US009417342B1

(12) United States Patent
Jäderström et al.

(10) Patent No.: US 9,417,342 B1
(45) Date of Patent: Aug. 16, 2016

(54) NUCLIDE DECAY DISCRIMINATOR SYSTEM AND METHOD

(71) Applicant: Canberra Industries, Inc., Meriden, CT (US)

(72) Inventors: Henrik Jäderström, Meriden, CT (US); Mark Vicuna, Meriden, CT (US); Wilhelm Mueller, Meriden, CT (US); Steve Fisher Jones, Meriden, CT (US)

(73) Assignee: CANBERRA INDUSTRIES, INC., Meriden, CT (US)

( * ) Notice: Subject to any disclaimer, the term of this patent is extended or adjusted under 35 U.S.C. 154(b) by 0 days.

(21) Appl. No.: 14/635,575

(22) Filed: Mar. 2, 2015

(51) Int. Cl.
*G01T 3/00* (2006.01)
*G01T 1/172* (2006.01)

(52) U.S. Cl.
CPC .................. *G01T 3/001* (2013.01); *G01T 1/172* (2013.01)

(58) Field of Classification Search
CPC ................................ G01T 1/172; G01T 3/001
See application file for complete search history.

(56) References Cited

U.S. PATENT DOCUMENTS

| 6,225,634 | B1 | 5/2001 | Kolotov et al. |
| 8,227,761 | B2 | 7/2012 | Zhu et al. |

OTHER PUBLICATIONS

Agostinelli, S., at at, "GEANT4 Collaboration," Nuclear Instruments & Methods in Physics Research A 506 (2003) p. 250-303.
Arnold, D. and Sima. O., "Application of GESPECOR software for the calculation of coincidence summing effects in special cases." Applied Radiation and Isotopes 60 (2004) p. 167-172.
Berlizov, A. N., "MCNP-CP—A Correlated Particle Radiation Source Extension of a General Purpose Monte Carlo N-Particle Transport Code," Applied Modeling and Computations in Nuclear Science; Semkow, T.M., et al.; Eds. ACS Symposium Series 945. American Chemical Society, Washington, DC (2006) p. 183-194.
Blaauw, M., Gelsema, S., "Cascade summing in gamma-ray spectrometry in marinelli-beaker geometries: the third efficiency curve," Nuclear Instruments and Methods in Physics Research, A 505 (2003) p. 311-315.
Blaauw, M., "The use of sources emitting coincident y-rays for determination of absolute efficiency curves of highly efficient Ge detectors," Nuclear Instruments and Methods in Physics Research, A 332 (1993) p. 493-500.

(Continued)

*Primary Examiner* — Mark R Gaworecki
(74) *Attorney, Agent, or Firm* — David W. Carstens; Kevin M. Klughart; Carstens & Cahoon, LLP

(57) ABSTRACT

A nuclide decay discriminator system and method is disclosed. The system utilizes a digital computing device (DCD) to capture radiation counts from a radiation detection device (RDD) such as a photon detector via the use of one or more integrated analog-to-digital converters (ADC). The radiation count information is then processed using a recursive procedure in the DCD that determines the desired nuclide to be evaluated and then defines the possible nuclide decay transition states. For each possible nuclide decay state, a recursive permutation of possible state transitions from this nuclide state is determined using a state permutation engine (SPE). Combinations of these state transition branches are linked to form state transition chains each having individual probabilities associated with the overall state transition chain. These state transition chain probabilities are applied to the RDD ADC data to form observed RDD radiation data radiation count probabilities and displayed in real-time.

30 Claims, 32 Drawing Sheets

(56) References Cited

OTHER PUBLICATIONS

De Corte, F., "The k0-Standardization Method: A Move to the Optimization of Reactor Neutron Activation Analysis," Agrégé Thesis, Rijksuniversitiet Gent (1987).

Keyser, R. M., Ortec, "The Evaluation of True Coincidence Effect on CTBTO-type Sample Geometry," The 2003 IEEE Nuclear Science Symposium and Medical imaging Conference, Portland, Oregon, Oct. 19-25, 2003.

Moens, L., at at. "Calculation of the Absolute Peak Efficiency of Ge and Ge(Li) Detectors for Different Counting Geometries," Journal of Radioartalytioal Chemistry, vol. 70, No. 1-2 (1982) p. 539-550.

Tuli, J. K, "Evaluated Nuclear Structure Data File." BNL-NCS-51655-01/02-Rev (2001).

Vidmar, T., et al., "Calculation of true coincidence summing corrections for extended sources with EFFTRAN," Applied Radiation and Isotopes 69 (2011) p. 908-911.

FIG. 3 *Prior Art*

| Final states and branching ratios for the decay of $^{60}$Co (data taken from Evaluated Nuclear Structure Data File (ENSDF)) | | | | |
|---|---|---|---|---|
| Final Nuclide State | Branching Ratio | | | k-electron Capture Probability |
| | $\beta^-$ | $\beta^+$ | EC | |
| 3 | 0.9988 | 0 | 0 | 0 |
| 2 | 0 | 0 | 0 | 0 |
| 1 | 0.0012 | 0 | 0 | 0 |

FIG. 29

Properties of the Transitions in $^{60}$Ni From $^{60}$Co Decays
(data retrieved from Evaluated Nuclear Structure Data File (ENSDF), except the branching ratio (P) which has been derived from Equation 18 reproduced above)

$$P_i = \frac{I_{\gamma,i}(1+\alpha)}{\sum_j I_{\gamma,j}(1+\alpha)}$$

| Nuclide Transition Number | Energy | Initial Nuclide State | Final Nuclide State | $I_\gamma$ | $\alpha$ | $\alpha_k$ | Branching Ratio (P) |
|---|---|---|---|---|---|---|---|
| 1 | 347.14 | 3 | 2 | 0.00750 | 0.0055700 | 0.0049900 | 0.000076 |
| 2 | 826.10 | 2 | 1 | 0.00768 | 0.0003370 | 0.0003030 | 0.86 |
| 3 | 1173.228 | 3 | 1 | 99.85 | 0.0001722 | 0.0001500 | 1.0 |
| 4 | 1332.492 | 1 | 0 | 99.9826 | 0.0001625 | 0.0001137 | 1.0 |
| 5 | 2158.57 | 2 | 0 | 0.0012 | 0.0004390 | 0.0000455 | 0.14 |
| 6 | 2505.692 | 3 | 0 | 0.0000863 | 0.0000776 | 0.0000863 | 864E−9 |

Possible Chains in $^{60}$Co Decay to $^{60}$Ni

Initial level denotes the level to which the $^{60}$Co nucleus decays.
Transitions indicates the transitions comprising the nuclide chain.
Transition numbers are taken from the table in FIG. 29.

| Nuclide Chain Number | Initial Level | Transitions | | | P |
|---|---|---|---|---|---|
| | | 1 | 2 | 3 | |
| 1 | 3 | 1 | 2 | 4 | 65.3E-6 |
| 2 | 3 | 1 | 5 | — | 10.6E-6 |
| 3 | 3 | 3 | 4 | — | 0.9988 |
| 4 | 3 | 6 | — | — | 863E-9 |
| 5 | 1 | 3 | — | — | 0.0012 |

| Nuclide Chain Number | Energy | Emission Probability |
|---|---|---|
| 1 | 7.461 | 0.240 |
| 2 | 7.478 | 0.122 |
| 3 | 8.265 | 0.0288 |
| 4 | 8.265 | 0.0148 |
| 5 | 8.329 | 0.000264 |

K-X-Ray Data for $^{60}$Co

FIG. 32

Peak and Total Efficiencies for the Involved Energies for the Two Point Sources and for the Sample

| Energy | Source 1 | | Source 2 | | Sample | |
|---|---|---|---|---|---|---|
| | $\varepsilon_p$ | $\varepsilon_t$ | $\varepsilon_p$ | $\varepsilon_t$ | $\varepsilon_p$ | $\varepsilon_t$ |
| 7.461 | 0.116 | 0.116 | 0.0821 | 0.0821 | 0.0991 | 0.0991 |
| 7.478 | 0.116 | 0.116 | 0.0825 | 0.0825 | 0.0993 | 0.0993 |
| 8.265 | 0.144 | 0.144 | 0.0998 | 0.0998 | 0.122 | 0.122 |
| 8.239 | 0.146 | 0.146 | 0.101 | 0.101 | 0.1225 | 0.1225 |
| 347.14 | 0.0936 | 0.179 | 0.0600 | 0.115 | 0.0768 | 0.147 |
| 826.10 | 0.0432 | 0.145 | 0.0278 | 0.0934 | 0.0355 | 0.119 |
| 1173.228 | 0.0325 | 0.131 | 0.0210 | 0.0847 | 0.0268 | 0.108 |
| 1332.492 | 0.0293 | 0.126 | 0.0189 | 0.0816 | 0.0241 | 0.104 |
| 2158.57 | 0.0192 | 0.110 | 0.0125 | 0.0712 | 0.0159 | 0.0906 |
| 2505.692 | 0.0168 | 0.106 | 0.0109 | 0.0685 | 0.0139 | 0.0873 |

NUCLIDE DECAY DISCRIMINATOR SYSTEM AND METHOD

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to radionuclide spectroscopy analysis using radiation detectors, and more specifically, to correcting the true coincidence summing (TCS) and calculating total efficiency during spectroscopy analysis of radionuclides undergoing cascading gamma or X-ray emissions. The present invention may have application to contexts in which discriminating multiple simultaneous nuclide decays is desired.

PRIOR ART AND BACKGROUND OF THE INVENTION

Background

Radioactive decay of a parent nuclide to the ground state of its daughter often results in the emission of several gamma ray photons in a cascade sequence. In some types of decay modes such as Electron Capture (EC) or transitions such as Internal Conversion (IC), X-rays are emitted in conjunction with the cascading gamma rays. During such an event if two photons with different energies are emitted in a cascade, and they are detected within the resolving time of the detector system, the two photons are said to be detected in true coincidence. The detector accumulates the sum total of the energy deposited by these two photons. If a photon deposits its full energy—and would normally be in the Full Energy Peak (FEP)—then any extra energy deposited from the second photon will remove the initial photon from the Full Energy Peak (FEP). As a result, events are lost from the Full Energy Peak (FEP) of the gamma-ray of interest. Such a loss is known as a "summing-out." Conversely, partial energy depositions from two cascading photons could add up and result in an extra count in the Full Energy Peak (FEP) of a gamma ray of interest. Such a gain in counts is known as "summing-in" when there is full energy deposition. If either of these events occurs, then activity determination based on the normal measurement of the FEP efficiency will be in error unless a correction is made.

Summing-in leads to an increase of an observable peak area, whereas summing-out leads to a decrease of an observable peak area. The total true coincidence summing effect (COI) with respect to a gamma line of interest (denoted with subscript "A") of a radionuclide under consideration is:

$$COI_A = (1 - L_A^{\gamma-\gamma} - L_A^{\gamma-X,511}) \cdot (1 + S_A^{\gamma-\gamma}) \cdot (1 + S_A^{\gamma-X,511}) \quad (1)$$

where $L_A^{\gamma-\gamma}$ and $S_A^{\gamma-\gamma}$ are the loss and gain probability due to coincidence between decay gamma-rays, and $L_A^{\gamma-X,511}$ and $S_A^{\gamma-X,511}$ are the loss and gain probability due to coincidence between decay gamma-rays and X-rays, and 511 keV annihilation photon. These probabilities are the sum of the partial probabilities calculated for individual decay chains involving the gamma line of interest:

$$L_A = \sum_{i=1}^{N} L_{A,i} \quad (2)$$

$$S_A = \sum_{j=1}^{M} S_{A,j} \quad (3)$$

The computation of $L_A^{\gamma-\gamma}$ and $S_A^{\gamma-\gamma}$ is well known and described in U.S. Pat. No. 6,225,634; the present invention extends the concept to include coincidence corrections for X-rays and gamma-rays, and the 511 keV photons and gamma-rays, e.g. computation of $L_A^{\gamma-X,511}$.

It is therefore necessary to correct the FEP efficiency for true coincidence effects. Various methods have been developed to deal with these "summing-in" and "summing-out" events. However, such methods fail to properly compensate FEP efficiency for true coincidence effects and are known to be problematic for this reason.

To compute the summing-in and summing-out probability, L. Moens et al. [J. Radioanal. Nucl. Chem. 70 (1982) 539] suggested the use of gamma-ray intensities and derived the mathematical formulae for practically important cases for gamma-ray true coincidence summing correction. F. De Corte [The $k_0$-Standardization Method: A Move to the Optimization of Reactor Neutron Activation Analysis, Agrégé thesis, Rijksuniversitiet Gent, 1987] updated the approach by Moens, and extended it for the cases of gamma-KX (EC) and gamma-KX (IC) true coincidences, but only for a single decay chain.

V. Kolotov et al. [J. Radioanal. Nucl. Chem. 233 (1998) 95; U.S. Pat. No. 6,225,634] implemented Moen's approach in Canberra Industries, Inc.'s Genie-2000 spectroscopy analysis software product. The implementation is based on the mapping of the efficiencies in the space around the detector. In Kolotov's method, the total sample efficiency is computed by knowing the Full Energy Peak (FEP) efficiency and the intrinsic Peak-to-Total (P/T) ratio. The method assumes that the introduction of a sample does not affect the P/T ratio for voluminous sources. The true coincidence correction factor at a gamma ray of interest can be obtained by numerical integration of the correction factors for volume elements that are small enough for the efficiencies to be considered constant within them. Furthermore, the software code only corrects for true coincidence summing between decay gamma-rays, and not between gamma and X-ray or 511 keV photons as in the present invention.

M. Blaauw [Nucl. Inst. Meth. Phys. Res., A332 (1993) 493] suggested a self-validating calibration method for simultaneous computation of the true coincidence effect and activity in the case of a highly efficient point source. Together with S. Gelsema, Blaauw [Nucl. Inst. Meth. Phys. Res., A505 (2003) 311] introduced a third efficiency curve to account for the variation of the detector efficiency over the source volume due to self-attenuation and scattering in the sample. M. Blaauw and Gelsema's method is implemented in Ortec's GAMMAVISION® spectroscopy analysis software product. However, the cascade summing correction results for radionuclides prone to gamma-X ray coincidences is marginal from the published data in the literature ["The evaluation of true coincidence effect on CTBTO-type sample geometry", The 2003 IEEE Nuclear Science Symposium and Medical Imaging Conference, Portland, Oreg., Oct. 19-25, 2003].

The GammaVision® product requires a geometry specific source based calibration that is both time consuming and expensive. Further, the performance of GammaVision® for radionuclides prone to gamma-X ray true coincidences summing is marginal, and there is no data available to verify the performance for gamma-511 keV true coincidence effects. Moreover, GammaVision® requires source-based calibrations for true coincidence summing correction, which can be both time consuming and very costly, and the cascade summing correction results are heavily dependent on the radionuclides in the calibration source and source geometry.

Kolotov's method uses a simple intrinsic P/T efficiency ratio calibration to estimate the total efficiency in a volume source. However, this can be used to correct for gamma-gamma true coincidence losses or gains, by utilizing P/T efficiency ratios that are maintained invariant throughout a voluminous source. This approach may introduce a higher uncertainty in the computed true coincidence correction factors. Using this method also requires the use of radioactive sources to determine the P/T efficiency calibration, which is then used to compute the total efficiency.

To date the true coincidence summing correction due to coincidence between gamma and X-rays or gamma and annihilation photons (or 511 keV) has not been adequately considered. Previous cascade summing correction inventions do not rigorously treat the gamma-KX ray and gamma-511 keV true coincidence summing analysis as does the present invention. Alternate methods can be employed using Monte Carlo codes such as MCNP-CP (Berlizov, A. N., MCNP-CP—A Correlated Particle Radiation Source Extension of a General Purpose Monte Carlo N-Particle Transport Code, Applied Modeling and Computations in Nuclear Science. Semkow, T. M., et al., Eds. ACS Symposium Series 945. American Chemical Society, Washington, D.C., 2006, p.183-194.) and GEANT (Nuclear Instruments & Methods in Physics Research, A 506 (2003) 250-303.). MCNP-CP and GEANT may be used to compute true coincidence summing effects that involve gamma-X rays (and gamma-511 keV photons) true coincidence. However, neither MCNP-CP nor GEANT are commonly available and both typical require exceedingly long computational times making such use impractical for other than academic settings.

Accordingly, a need exists for a method for efficiently computing the true coincidence summing correction factors between gamma-KX ray and gamma-511 keV events. Further, a need exists for a method of computing the voxelized total efficiency with gamma-ray buildup correction directly from a mathematical model to improve accuracy of the true coincidence correction factor for voluminous sources. The present invention satisfies these needs and others as demonstrated in the detailed description below.

Background Information

Many nuclides emit more than one photon from a single decay. The time between the emissions are much shorter than the resolving time of the detectors used to detect the photons. There is a possibility that the detector will detect more than one photon from the decay which will change the number counts in the Full Energy Peaks (FEP) and therefore also the activity determined of the nuclide. This phenomenon is called true coincidence summing (TCS).

The prior art teaches a system and method for TCS correction and has been described in various patents (See H. Zhu, et al., TRUE COINCIDENCE SUMMING CORRECTION AND TOTAL EFFICIENCY COMPUTATION FOR RADIONUCLIDE SPECTROSCOPY ANALYSIS, U.S. Pat. No. 8,227,761; and V. Kolotov, V. Atrashkevich, TRUE COINCIDENCE SUMMING CORRECTION FOR RADIATION DETECTORS, U.S. Pat. No. 6,225,634; each hereby incorporated by reference).

The finite energy resolution of the detector makes it possible that some energies emitted are indistinguishable to the radiation detector and there are currently no prior art systems or methodologies that accurately discriminate nuclide decay in these circumstances. The extra peaks created by the summing of two or more photons in the decay makes nuclide identification more complicated and error prone in all prior art system configurations.

Deficiencies in the Prior Art

Current methods for True Coincidence Summing (TCS) Corrections are approaches found in products such as Genie-2000 V3.3 (see H. Zhu et al., "True coincidence summing correction and total efficiency computation for radionuclide spectroscopy analysis", U.S. Pat. No. 8,227,761; V. Kolotov, V. Atrashkevich, "True coincidence summing correction for radiation detectors", U.S. Pat. No. 6,225,634; L. Moens, et al., J. Radioanal. Nucl. Chem. 70 (1982) 539; F. De Corte, The k0-Standardization Method: A Move to the Optimization of Reactor Neutron Activation Analysis, Habil. Thesis, University of Gent, Belgium, 1987), the algorithms in Ortec's GammaVision V7 (see M. Blaauw, Nucl. Inst. Meth. Phys. Res., A332 (1993) 493; M. Blaauw, Nucl. Inst. Meth. Phys. Res., A505 (2003) 311; R. Keyser, "The evaluation of true coincidence effect on CTBTO-type sample geometry", The 2003 IEEE Nuclear Science Symposium and Medical Imaging Conference, Portland, Oreg., Oct. 19-25, 2003), GESPECOR (see D. Arnold and O. Sima, Applied Radiation and Isotopes 60 (2004) 167), EFFTRAN (see T. Vidmar et al., Applied Radiation and Isotopes 69 (2011) 908), and software using Monte Carlo methods (e.g. GEANT (see S. Agostinelli et al., Nucl. Inst. Meth. Phys. Res., A506 (2003) 250) and MCNP-CP (see A. N. Berlizov, Applied Modeling and Computations in Nuclear Science, chapter 13 183-194 ACS Symposium Series, Vol. 945, (2006)).

The simplified treatment of the decay used in prior art systems such as the Genie-2000 V3.3 makes it impossible to correctly treat complex decays where the decays branch out and later merge to the same level. Other systems such as the GammaVision V7 needs a geometry specific source based calibration that is both time consuming and expensive. Also, from the published data in the literature, the performance of GammaVision V7 for radionuclides prone to gamma-X ray true coincidences summing is marginal, and there is no data available to verify the performance for gamma-511 keV true coincidence effects. Monte Carlo computer codes such as MCNP-CP and GEANT can be used to compute true coincidence summing effects that involve gamma-X rays (and gamma-511 keV photons) for any complexity of the decay, but obtaining an appropriate result requires very long computational times.

While some of the prior art may teach some solutions to several of these problems, the core deficiencies in the prior art systems relating to TCS correction have not been addressed.

OBJECTIVES OF THE INVENTION

Accordingly, the objectives of the present invention are (among others) to circumvent the deficiencies in the prior art and affect the following objectives:

(1) Provide for a nuclide decay discriminator system and method that accurately corrects for emissions among all possible decay chains.

(2) Provide for a nuclide decay discriminator system and method that uses all the possible decay chains that have probability of more than a threshold value and discard decay chains that have negligible impact on the TCS correction factor.

(3) Provide for a nuclide decay discriminator system and method that uses all decay chains that contribute to the correction factor to make the TCS applicable to all types of decays.

(4) Provide for a nuclide decay discriminator system and method that uses a minimum efficiency for each chain, on a point by point basis, to determine if the chain has a non-negligible impact on the coincidence summing factor.

(5) Provide for a nuclide decay discriminator system and method that is able to predict the relative peak size of peaks that are summed into but does not have transition energy in the decay schema.

(6) Provide for a nuclide decay discriminator system and method that uses relative peak sizes to identify the nuclides using X-ray-X-ray sum peaks, gamma-X-ray sum peaks, gamma-gamma sum peaks, and gamma-annihilation photon sum peaks.

(7) Provide for a nuclide decay discriminator system and method that calculates sum peaks from more than two photons with no upper limit on how many photons that can be used.

(8) Provide for a nuclide decay discriminator system and method that sums in correction factors that can be calculated from transitions in any decay chain with transitions that do not have to be from successive levels nor do they have to start from the same level as the gamma ray of interest.

(9) Provide for a nuclide decay discriminator system and method that uses timing information from a multi-channel analyzer or other electronics to break chains that have half-lives longer than the time it takes for the electronics to read the pulse information from the radiation detector.

(10) Provide for a nuclide decay discriminator system and method that uses the energy resolution of the detector to determine how close in energy the sum of two photons have to be for the analysis not to be able to distinguish between the two peaks when looking for potential sum peaks.

(11) Provide for a nuclide decay discriminator system and method that is able to treat indistinguishable energies (energies close enough so that it is not possible to distinguish between them) which are emitted in the same decay.

(12) Provide for a nuclide decay discriminator system and method that is capable of correcting for complex decays that prior art systems could not provide correct results for by considering all possible ways that the nuclide can decay and using the probability of the decay chain and the peak and total efficiencies to discard decay chains that have negligible impact on the correction factor.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention addresses several of the deficiencies in the prior art in the following manner. The systems and methods in this formulation extend upon the disclosure in U.S. Pat. No. 8,277,761 by storing and accessing the nuclear data in a novel way to allow additional correlations to be computed that were previously not possible.

The present invention improvement/extension of the prior art system/method described herein is capable of correcting for complex decays that the prior art is incapable of obtaining a correct answer and achieves this advantage by considering all possible ways that the nuclide can decay. It uses the probability of the nuclide decay chain and the peak and total efficiencies to discard nuclide decay chains that have a negligible impact on the correction factor.

The finite energy resolution of a radiation detector makes it possible that some energies emitted are indistinguishable to the detector and present invention methods are able to correctly treat this both for summing out and summing-in. The extra peaks created by summing of two or more photons in the decay makes nuclide identification more complicated and error prone. The present invention incorporates methods capable of predicting the energy and peak area of these extra sum peaks. This information is to be used by the nuclide identification system and method to distinguish radiation sources that were previously indistinguishable with prior art systems.

BRIEF DESCRIPTION OF THE DRAWINGS

For a fuller understanding of the advantages provided by the invention, reference should be made to the following detailed description together with the accompanying drawings wherein:

FIG. 29 illustrates a table of the transitions in $^{60}$Ni from $^{60}$Co decays;

FIG. 30 illustrates a table of possible chains in $^{60}$Co decay to $^{60}$Ni;

FIG. 32 illustrates a table of peak and total efficiencies for the involved $^{60}$Co energies for two point sources and for the sample.

DESCRIPTION OF THE PRESENTLY PREFERRED EXEMPLARY EMBODIMENTS

Figure 1:
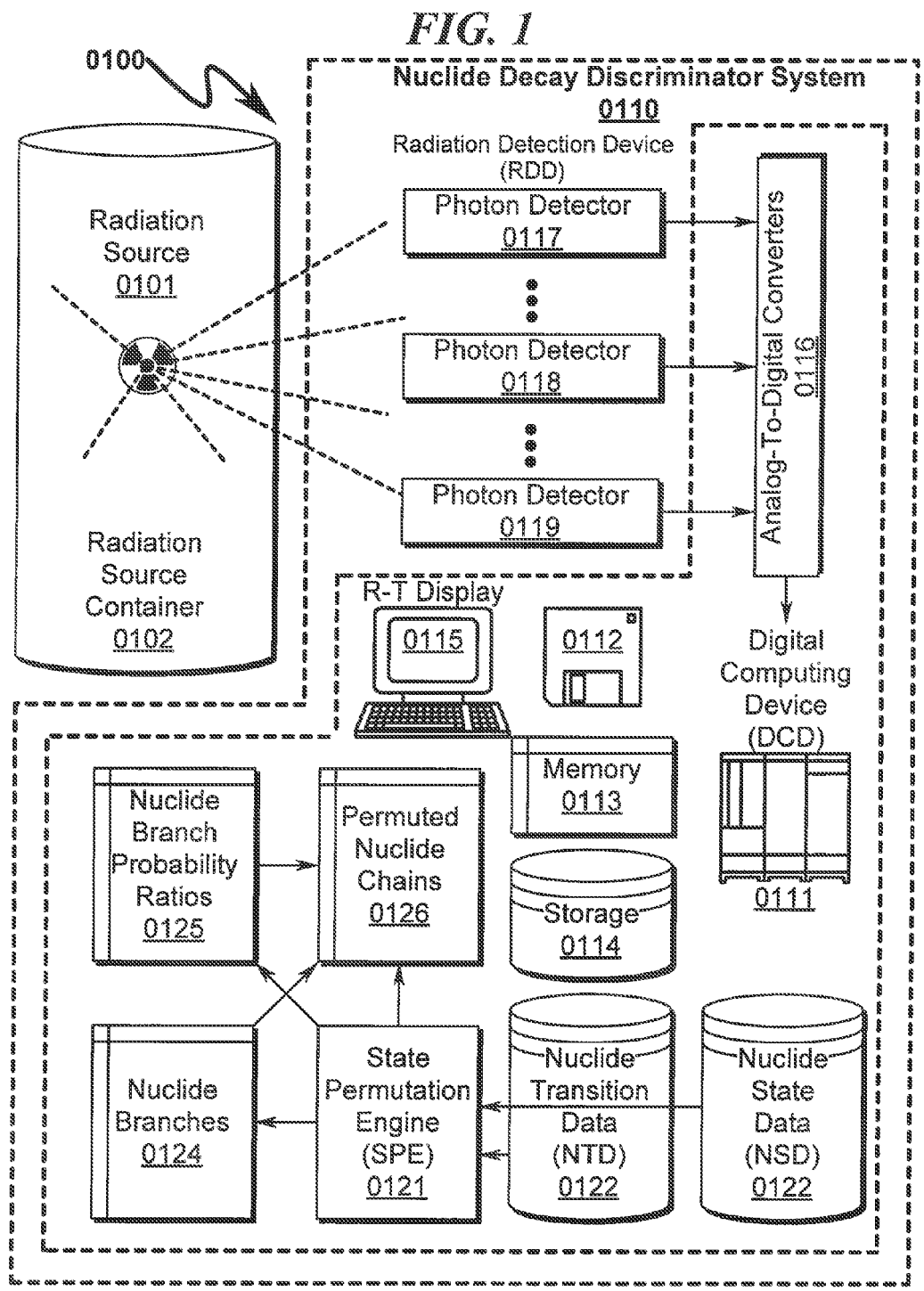
FIG. 1 illustrates a block diagram depicting a general system overview of a preferred exemplary invention embodiment.

While the present invention is susceptible of embodiment in many different forms, there is shown in the drawings and will herein be described a variety of detailed preferred embodiments of the invention with the understanding that the present disclosure is to be considered as an exemplification of the principles of the invention and is not intended to limit the broad aspect of the invention to the embodiment(s) illustrated.

The numerous innovative teachings of the present application will be described with particular reference to the presently preferred embodiment, wherein these innovative teachings are advantageously applied to the particular problems of a NUCLIDE DECAY DISCRIMINATOR SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Parallel Processing

The present invention anticipates situations in which the system as described herein may incorporate parallel processing to simultaneously process incoming data from the radiation detectors in real-time to discriminate a variety of nuclides that may be present in a radiation sample.

System Overview (0100)

An overview of the present invention system functionality is depicted in FIG. 1 (0100) wherein a radiation source (0101) positioned within a radiation source container (0102) emits radiation via nuclide decay to the nuclide decay discriminator system (NDD) (0110). The NDD (0110) comprises special purpose hardware that integrates a digital computing device (DCD) (0111) executing software retrieved from a computer readable medium (0112) and incorporating local digital memory (0113), fixed media storage (0114), and a real-time display device (0115). This DCD (0111) incorporates memory (0113) and fixed media storage (0114) to collect data from one or more high speed analog-to-digital converter (ADC) (0116) modules that read information from photon detectors (0117, 0118, 0119) positioned to detect emitted radiation from the radiation source (0101).

A real-time display device (0115) may be incorporated within the system to communicate identified nuclides to a user and/or permit modification of radiation detection parameters associated with the photon detectors (0117, 0118, 0119) and associated specialized ADC data capture electronics (0116). The photon detectors (0117, 0118, 0119) may be configured to detect a variety of radiation types including alpha, beta, and/or gamma radiation. Various analysis processes associated with the collection and discrimination of data from the special purpose radiation detection hardware interfaces (0117, 0118, 0119) and ADC data capture electronics (0116) serve to permit both collection and discrimination of nuclide decay information from the radiation source (0101).

Within this context the system utilizes a state permutation engine (SPE) (0121) comprising hardware that allows chains of nuclide decay branches to be recursively permuted and compared in parallel to incoming real-time radiation data from the photon detectors (0117, 0118, 0119) via the ADCs (0116). Within this context the system utilizes a nuclide state database (NSB) (0122) that defines various nuclide states and their energies and a nuclide transition database (NTD) (0123) that defines the branch energies associated with various nuclide states. Information in these databases (0122, 0123) is used by the nuclide state permutation engine (SPE) (0121) that first determines the branch energies (0124) associated with a given nuclide under inspection and then determines probabilities associated with these branches (0125). This information is then used as a basis to recursively permute all combinations of nuclide state transitions to form nuclide chains (0126) with associated transition energies and probabilities. This recursive permuted nuclide chain list (0126) is then sifted to eliminate low probability chain transitions and compared in real-time with incoming data from the photon detectors (0117, 0118, 0119) via the high speed analog-todigital converters (0116) integrated within the DCD (0111). Correction factors associated with the nuclide chains (0126) are applied to the incoming radiation data to form true coincidence sum counts for the measured radiation data.

The real-time display (0115) in the system permits an operator to select specific nuclides (or groups of nuclides) to be grouped as a nuclide inspection list (NIL) for parallel evaluation by the DCD (0111) and SPE (0121) and also permits real-time-display of measured radiation events. As the system is designed to operate in a real-time context, the computations and analysis of the DCD (0111) and SPE (0121) must meet stringent processing delay requirements which preclude substitution of their functionality by human effort or thought processes. As an example, it should be noted that the SPE (0121) is required to determine (N!) nuclide decay chains for a nuclide having (N+1) energy states. This precludes human analysis for this application as this information must be applied to incoming radiation data from the photon detectors (0117, 0118, 0119) in parallel as the data is collected to produce a real-time display of the corrected radiation count information.

Nuclide Decay Overview (0200)

Figure 2:
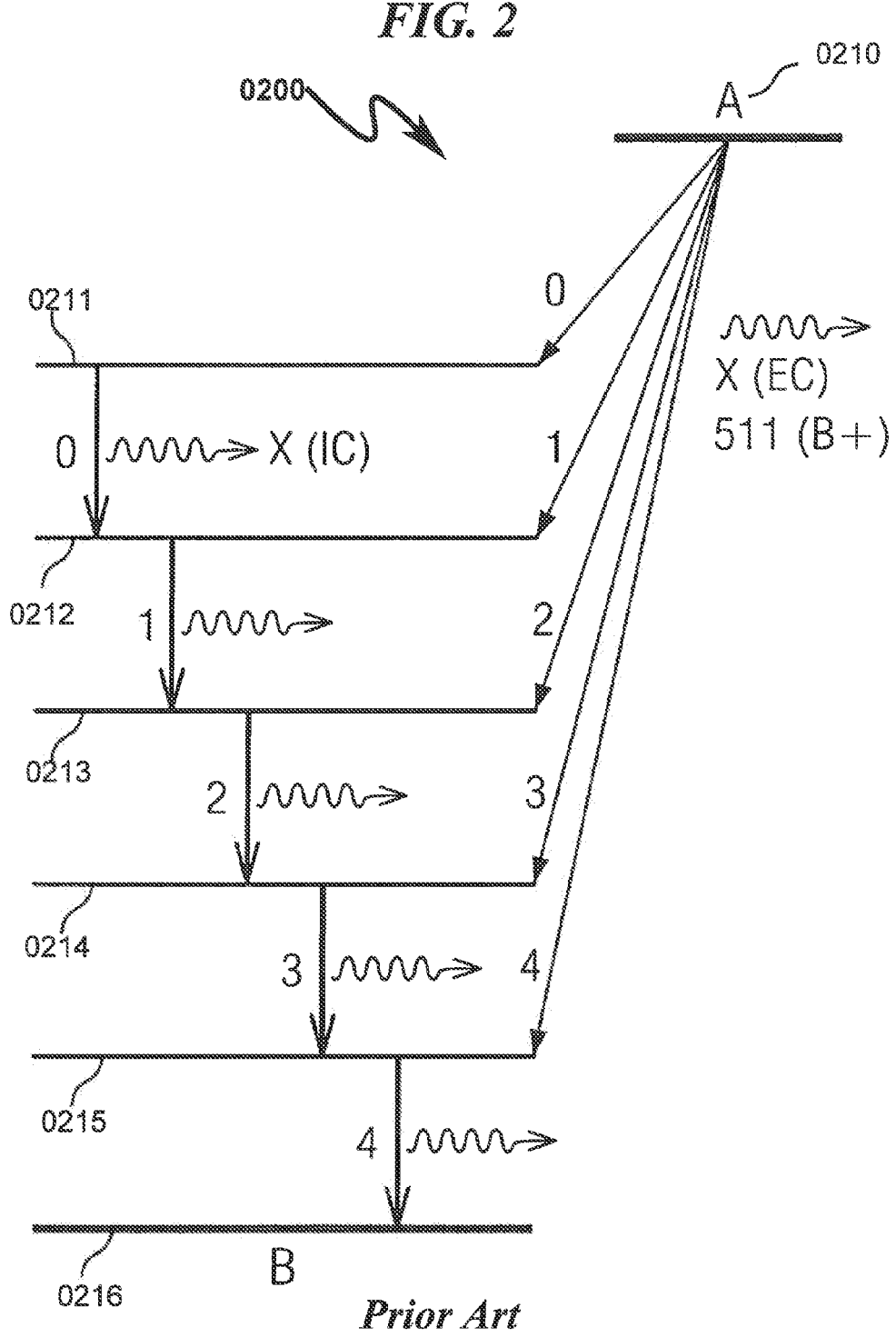
FIG. 2 illustrates a typical nuclide decay characteristic depicting a number of energy branch states.

FIG. 2 (0200) depicts a generic decay chain wherein a parent nuclide decays to its daughter nuclide through Electron Capture decay or Positron decay. The sequence begins when a parent nuclide (0210) transitions to an excited state of its daughter nuclide through Electron capture decay or Positron decay, possibly releasing an x-ray or two annihilation photons. The excited daughter nucleus in this depiction undergoes up to five sequential transition events (0211, 0212, 0213, 0214, 0215, 0216) releasing several gamma and x-ray photons along the way.

Exemplary Radiation Detector (0300)

Figure 3:
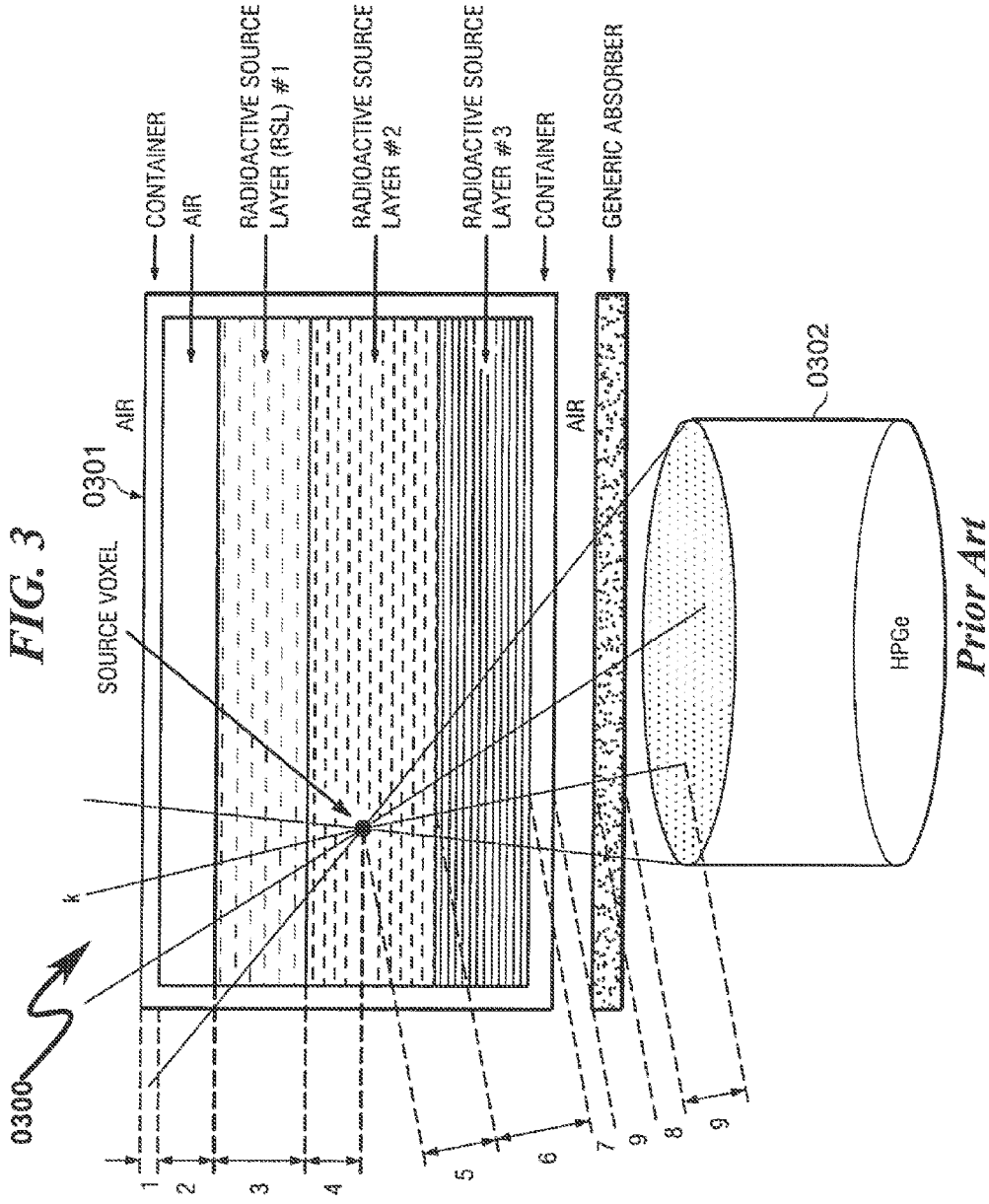
FIG. 3 illustrates a typical radiation detector and associated sample having multiple nuclide sources.

FIG. 3 (0300) depicts a general cross-section view of a sample matrix (0301) to be assayed by an HPGe detector (0302) using the present invention system and method described herein. In this example, the sample consists of three radioactive source layers (RSL #1 through #3), a sealed container (0301), and air inside and outside of the container. An air gap also exists between the sample (0301) and the detector (0302).

Method Overview (0400)

Figure 4:
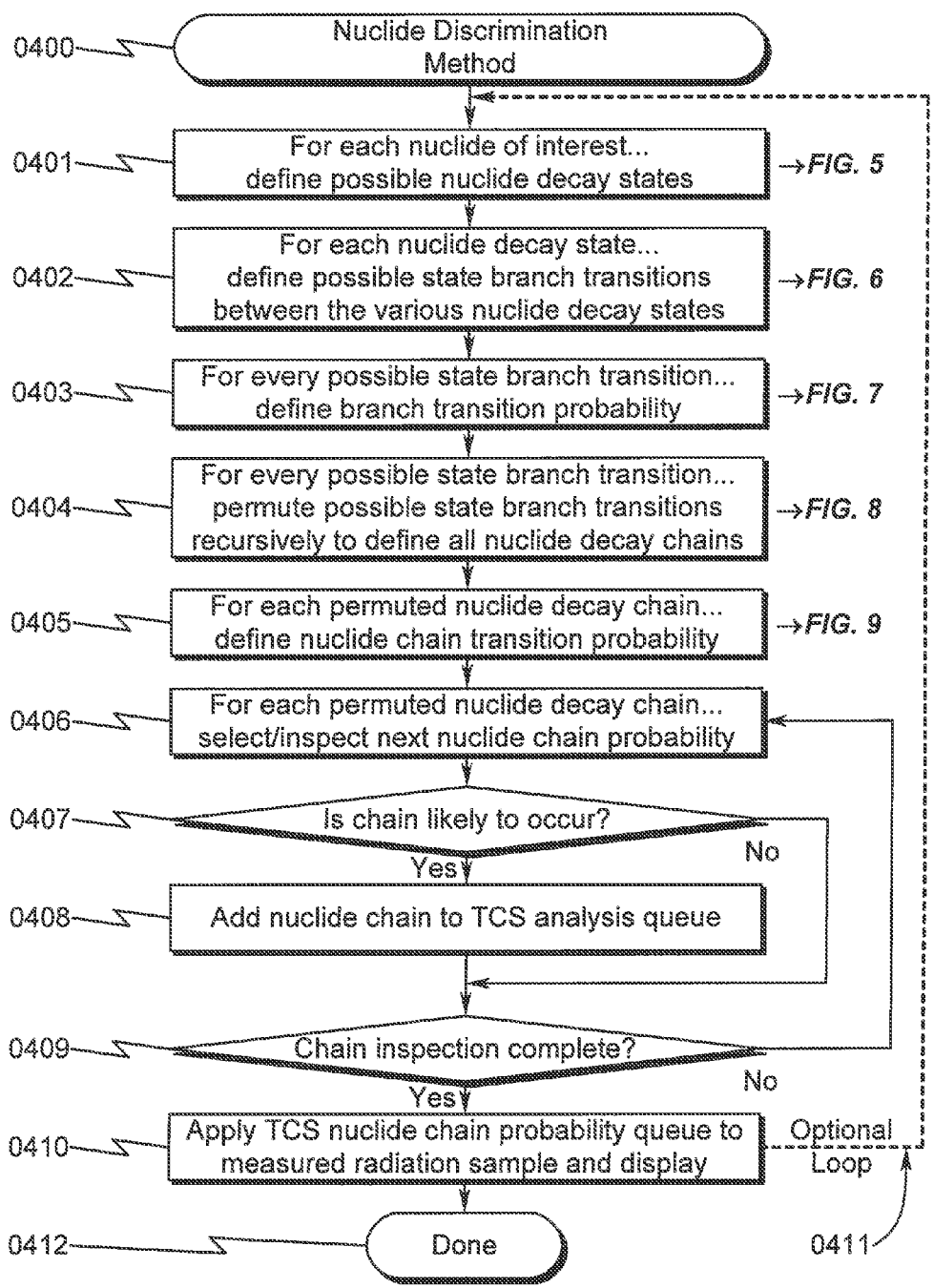
FIG. 4 illustrates a flowchart depicting a method overview of a preferred exemplary invention embodiment.

An exemplary present invention overview method can be generally described in the flowchart of FIG. 4 (0400) as incorporating the following steps:

(1) defining possible nuclide decay states for each nuclide of interest (0401);
(2) defining possible state branch transitions between the various nuclide decay states for each nuclide decay state (0402);
(3) defining branch transition probability for every possible state branch transition (0403);
(4) permuting possible state branch transitions recursively to define all nuclide decay chains for every possible state branch transition (0404);
(5) define nuclide chain transition probability for each permuted nuclide decay chain (0405);
(6) selecting and/or inspecting the next nuclide chain probability for each permuted nuclide decay chain (0406);
(7) determining if a nuclide chain likely to occur, and if not, proceeding to step (9) (0407);
(8) adding the nuclide chain to the true coincidence summing (TCS) analysis queue (0408);
(9) determining if the nuclide chain inspection is complete, and if not, proceeding to step (6) (0409);
(10) applying the TCS nuclide chain probability queue to real-time measured radiation sample data and displaying the result to an operator in real-time (0410);
(11) optionally proceeding to step (1) to analyze additional nuclides (0411); and
(12) terminating the nuclide decay discriminator method (0412).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Nuclide State Energy Levels (0500)

Figure 5:
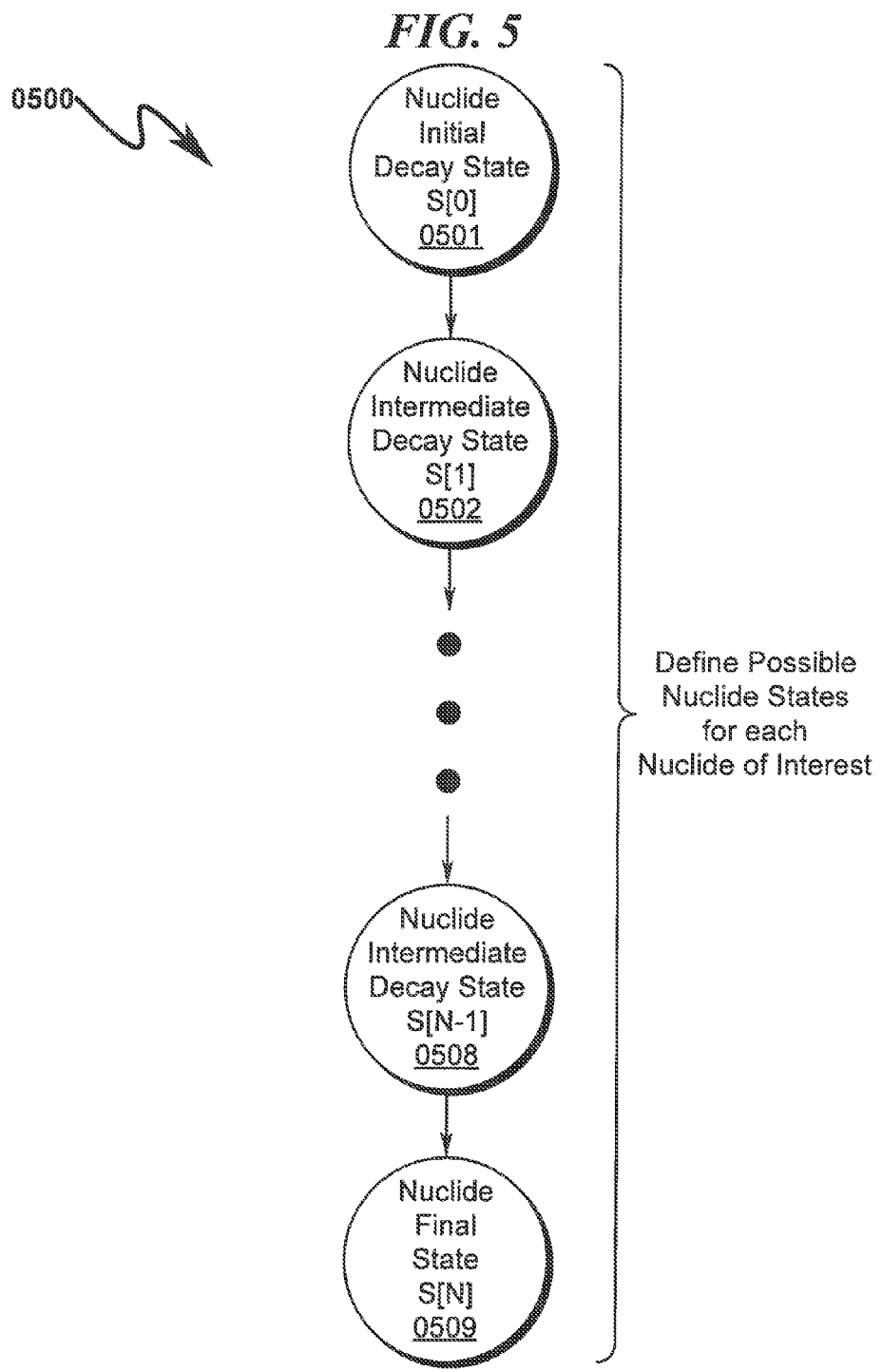
FIG. 5 illustrates a generic nuclide and associated states.

As generally depicted in FIG. 5 (0500), the nuclide state database (NSD) as inspected by the SPE generally defines the various states of nuclide decay (0501, 0502, 0508, 0509) starting from an initial state S[0] and ending in a final state S[N]. For each nuclide having (N+1) total states, there will be N non-terminal energy states.

Nuclide State Branching Energy (0600)

Figure 6:
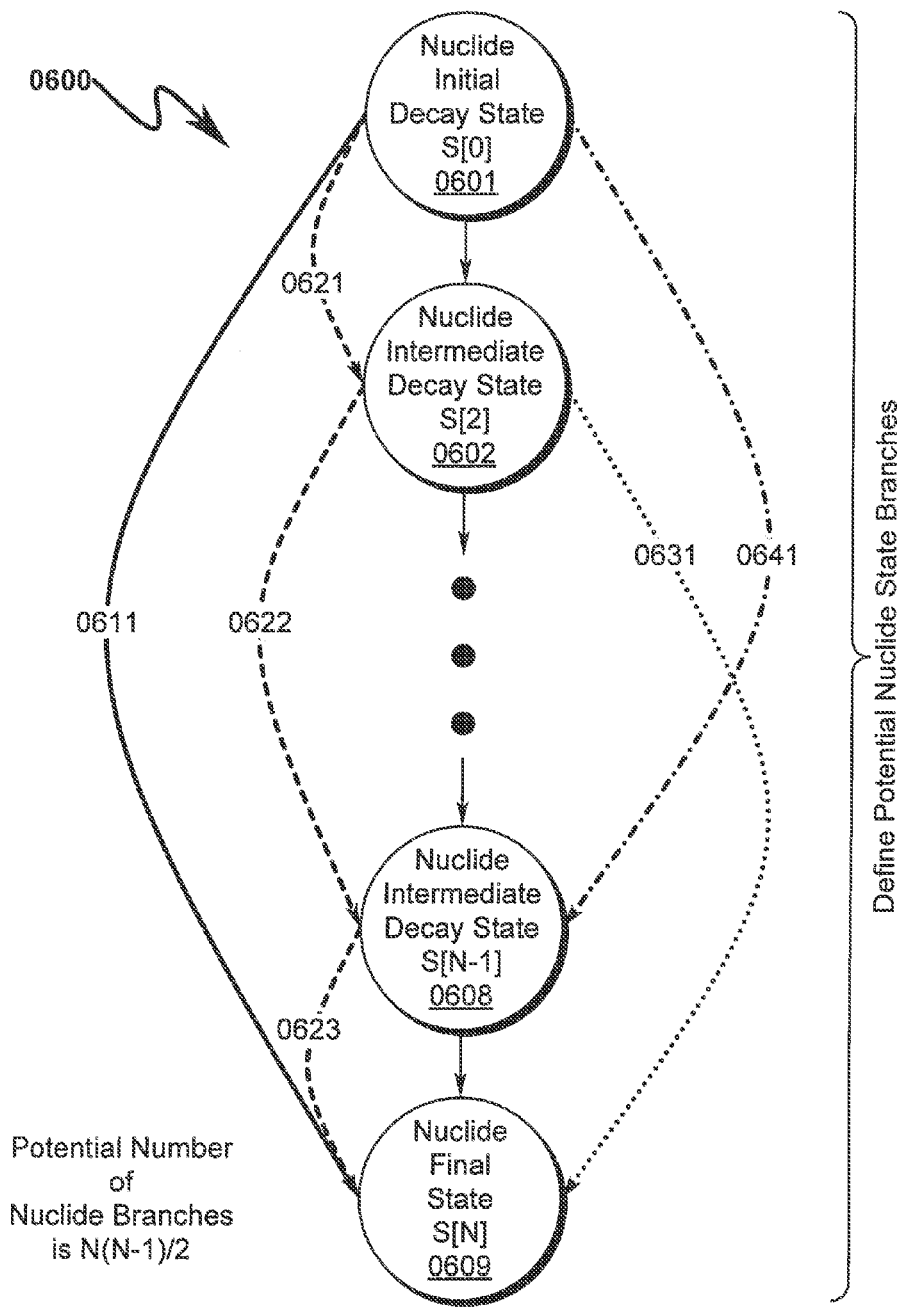
FIG. 6 illustrates a generic nuclide and associated branch energies.

As generally depicted in FIG. 6 (0600), the nuclide transition database (NTD) as inspected by the SPE generally defines the various branch energy transitions (0611, 0621, 0622, 0623, 0631, 0641) between nuclide states (0601, 0602, 0608, 0609) starting from an initial state S[0] and ending in a final state S[N]. For each nuclide having (N+1) total states, there will be N(N−1)/2 potential nuclide branches.

Nuclide State Chains (0700)

Figure 7:
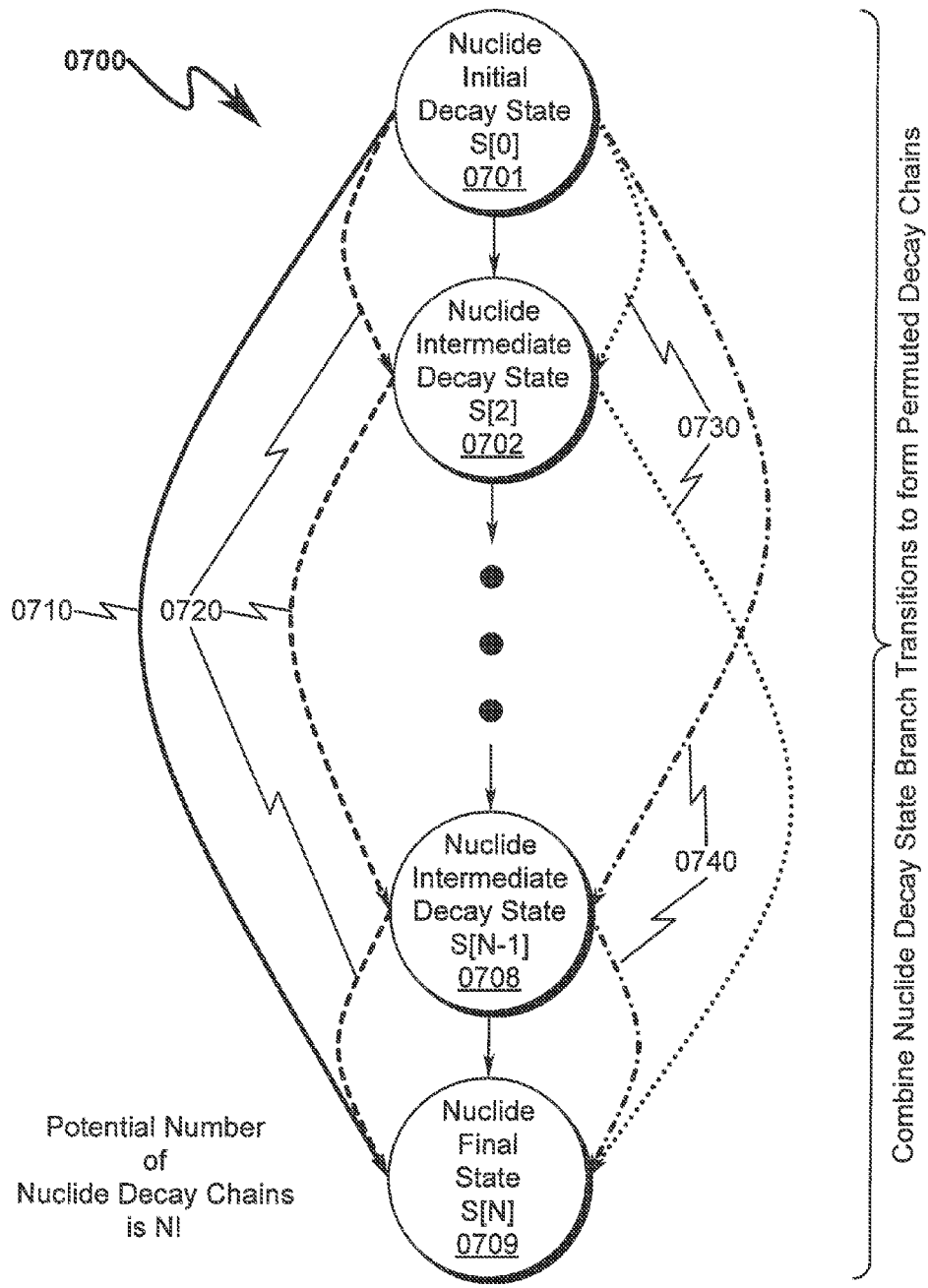
FIG. 7 illustrates a generic nuclide and associated nuclide chains.

These branch transitions depicted in FIG. 6 (0600) are assembled by the SPE and used to form nuclide chains as generally depicted in FIG. 7 (0700). The SPE recursively permutes the branches depicted in FIG. 6 (0600) to form nuclide chains (0710, 0720, 0730, 0740) between the various nuclide decay states (0701, 0702, 0708, 0709). For each nuclide having (N+1) total states, there will be (N!) potential nuclide chains.

Nuclide State Chain Probabilities (0800)

Figure 8:
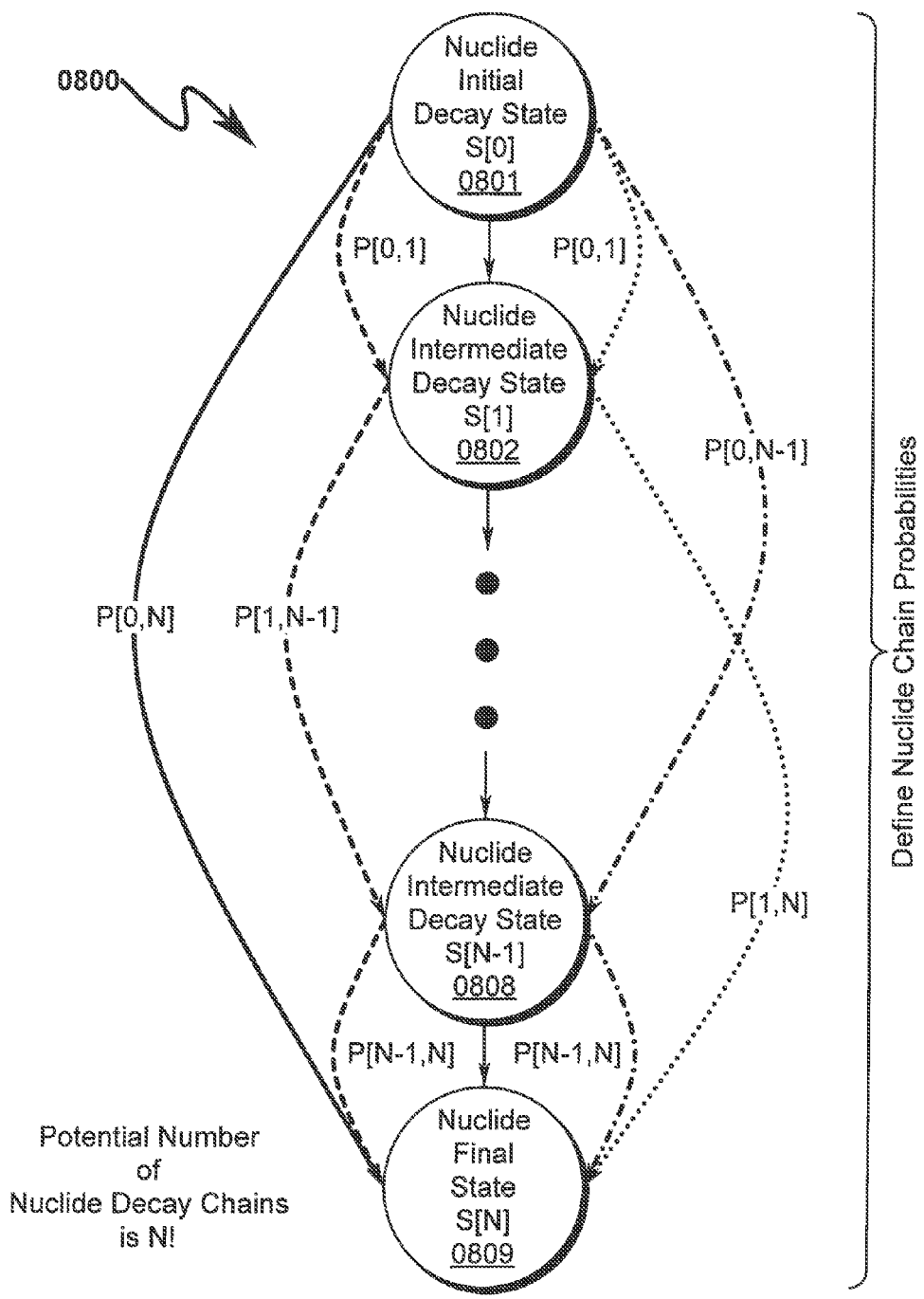
FIG. 8 illustrates a generic nuclide and associated nuclide chain probabilities.

These nuclide decay chains depicted in FIG. 7 (0700) may be processed by the SPE to form nuclide chain probabilities as generally depicted in FIG. 8 (0800). The SPE recursively permutes the branches depicted in FIG. 6 (0600) to form nuclide chain probabilities (0810, 0820, 0830, 0840). For each nuclide having (N+1) total states, there will be (N!) potential nuclide chain probabilities.

Each chain will have associated branch energies associated with the decays between states within a given chain. These branching energies are used by the SPE as a comparison against measured radiation detection levels to form correction factors for measured radiation based on the probabilities of decay within a given nuclide decay chain.

Overview of SPE Functions (0900)-(1800)

Figure 9:
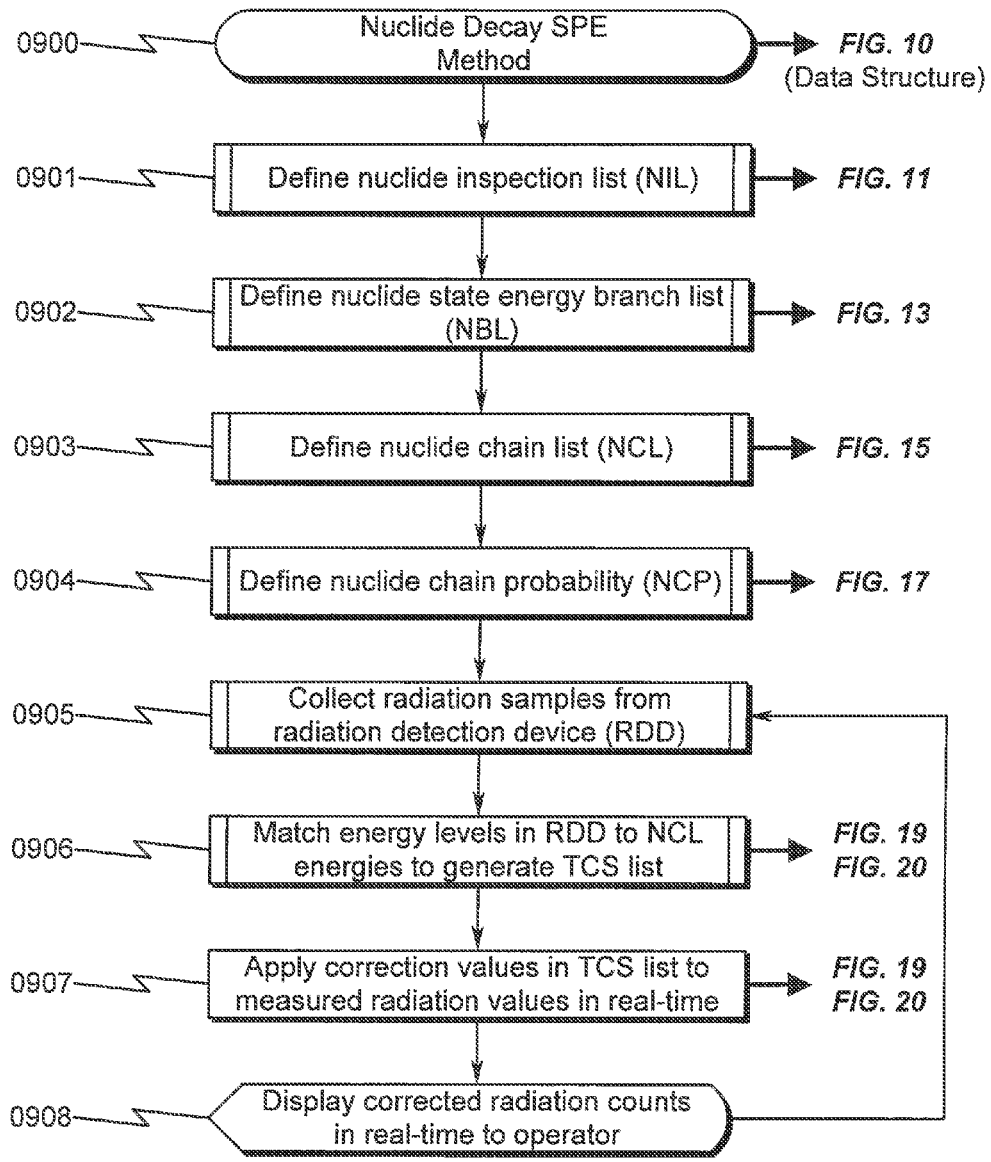
FIG. 9 illustrates a flowchart depicting a presently preferred invention embodiment method implementing a data definition method.

A general overview of the functionality of the SPE is depicted in the flowchart of FIG. 9 (0900) and involves the following steps:

(1) Defining the nuclide inspection list (NIL) (0901);
(2) Defining the nuclide state energy branch list (NBL) (0902);
(3) Defining the nuclide chain list (NCL) (0903);
(4) Defining the nuclide chain probability (NCP) (0904);
(5) Collecting radiation samples from the radiation detection device (RDD) (0905);
(6) Match the energy levels in the RDD to NCL energies to generate a TCS list (0906);
(7) Applying the correction values in the TCS list to measured radiation values in real-time (0907); and (8) Displaying corrected radiation counts in real-time to an operator display interface and proceeding to step (5) to collect more radiation samples (0908).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Figure 10:
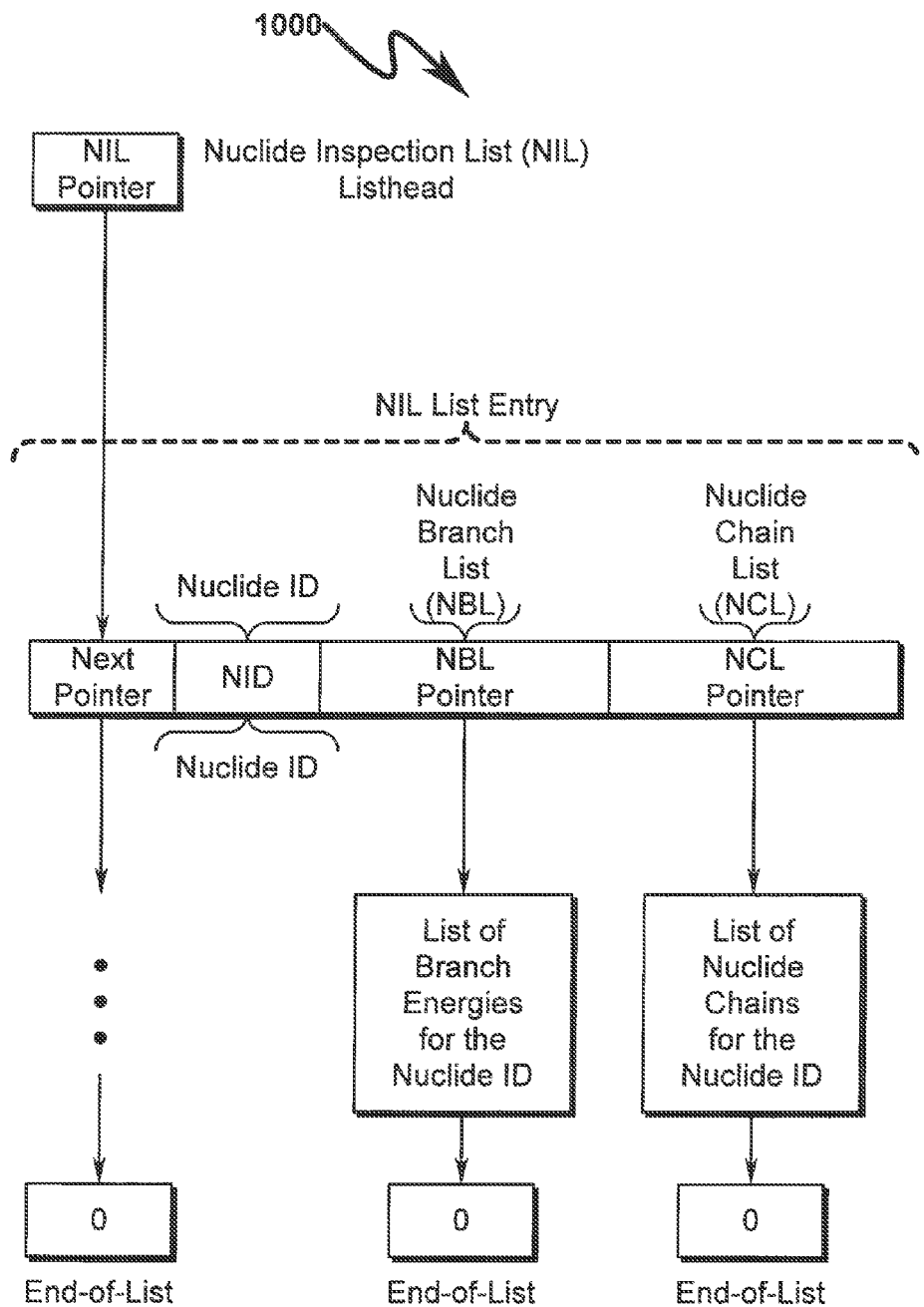
FIG. 10 illustrates a data structure associated with the flowchart of FIG. 9.
Figure 11:
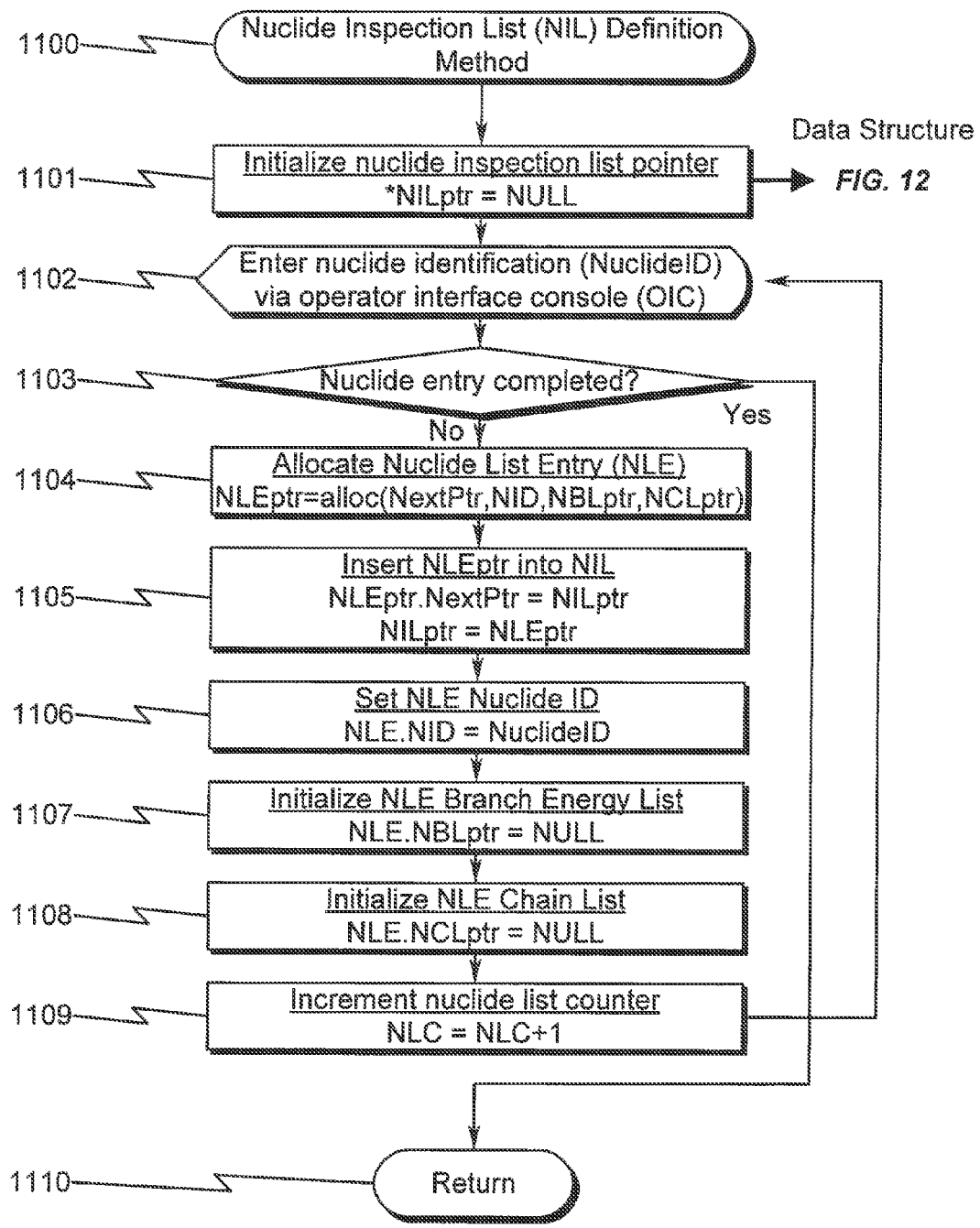
FIG. 11 illustrates a flowchart depicting a presently preferred invention embodiment method implementing a nuclide inspection list (NIL) definition method.
Figure 12:
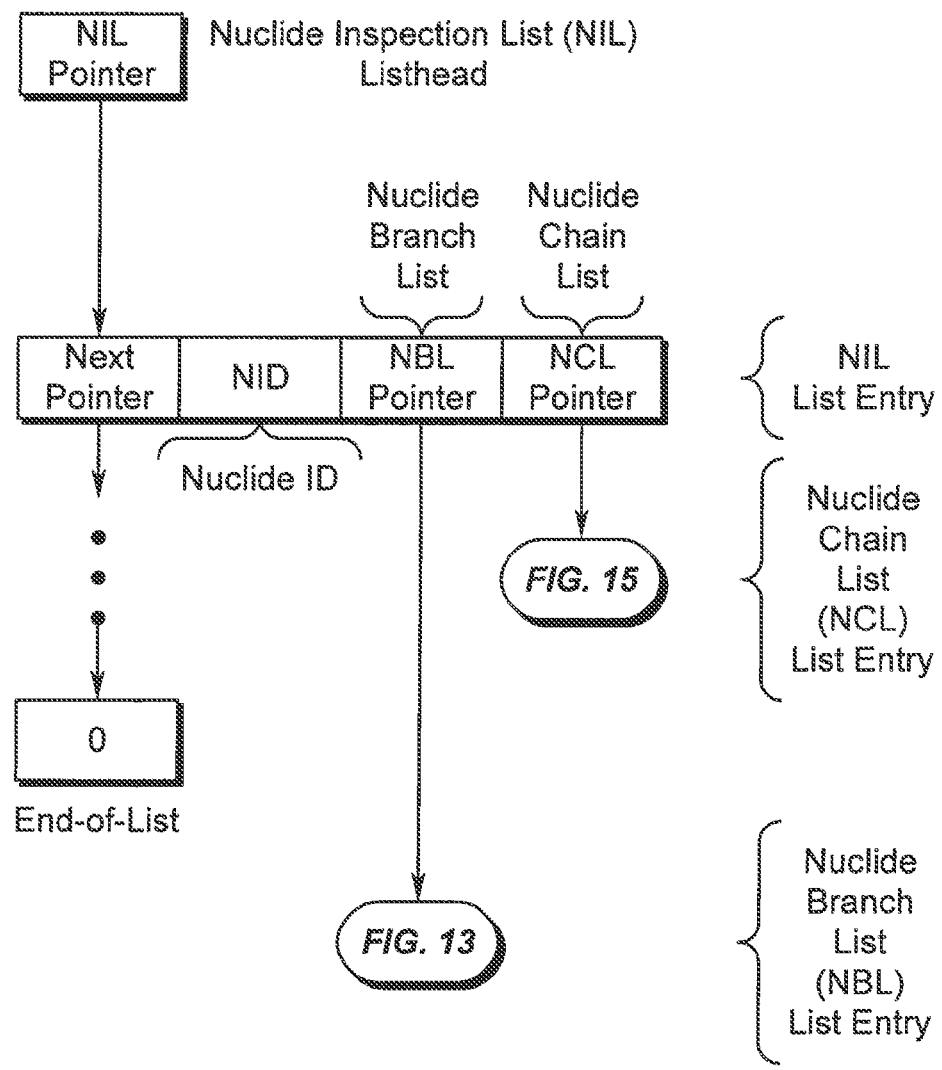
FIG. 12 illustrates a data structure associated with the flowchart of FIG. 11.
Figure 13:
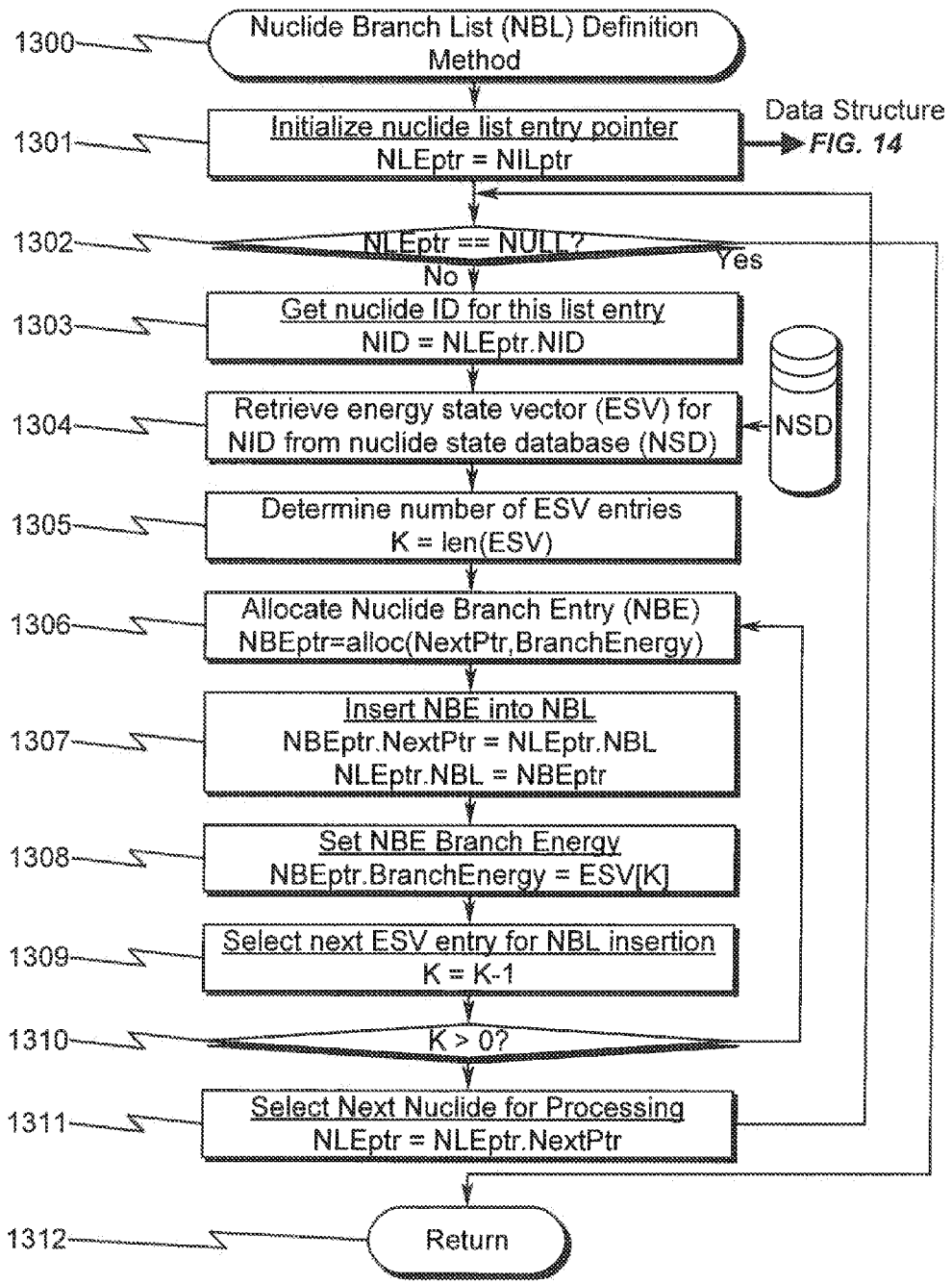
FIG. 13 illustrates a flowchart depicting a presently preferred invention embodiment method implementing a nuclide branch list (NBL) definition method.
Figure 14:
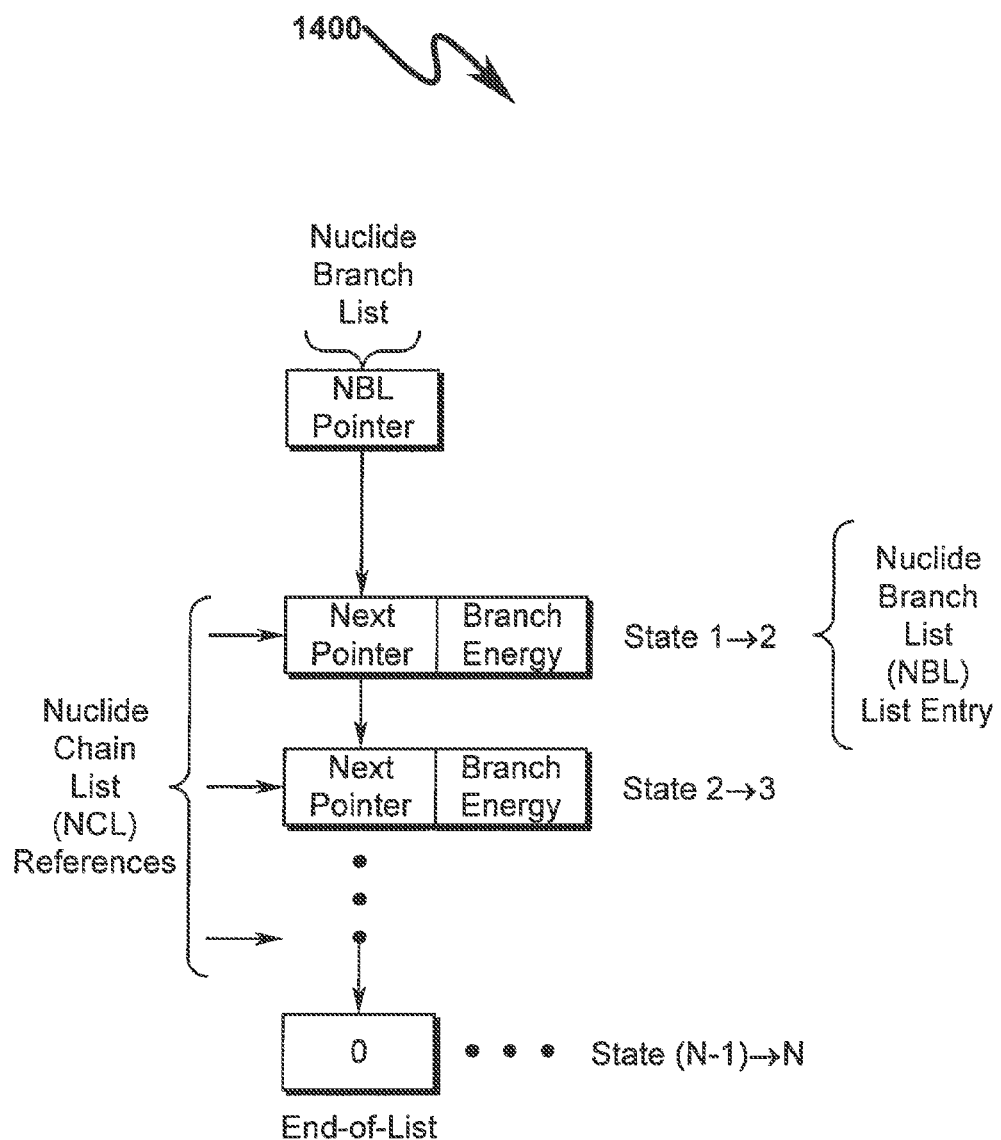
FIG. 14 illustrates a data structure associated with the flowchart of FIG. 13.
Figure 17:
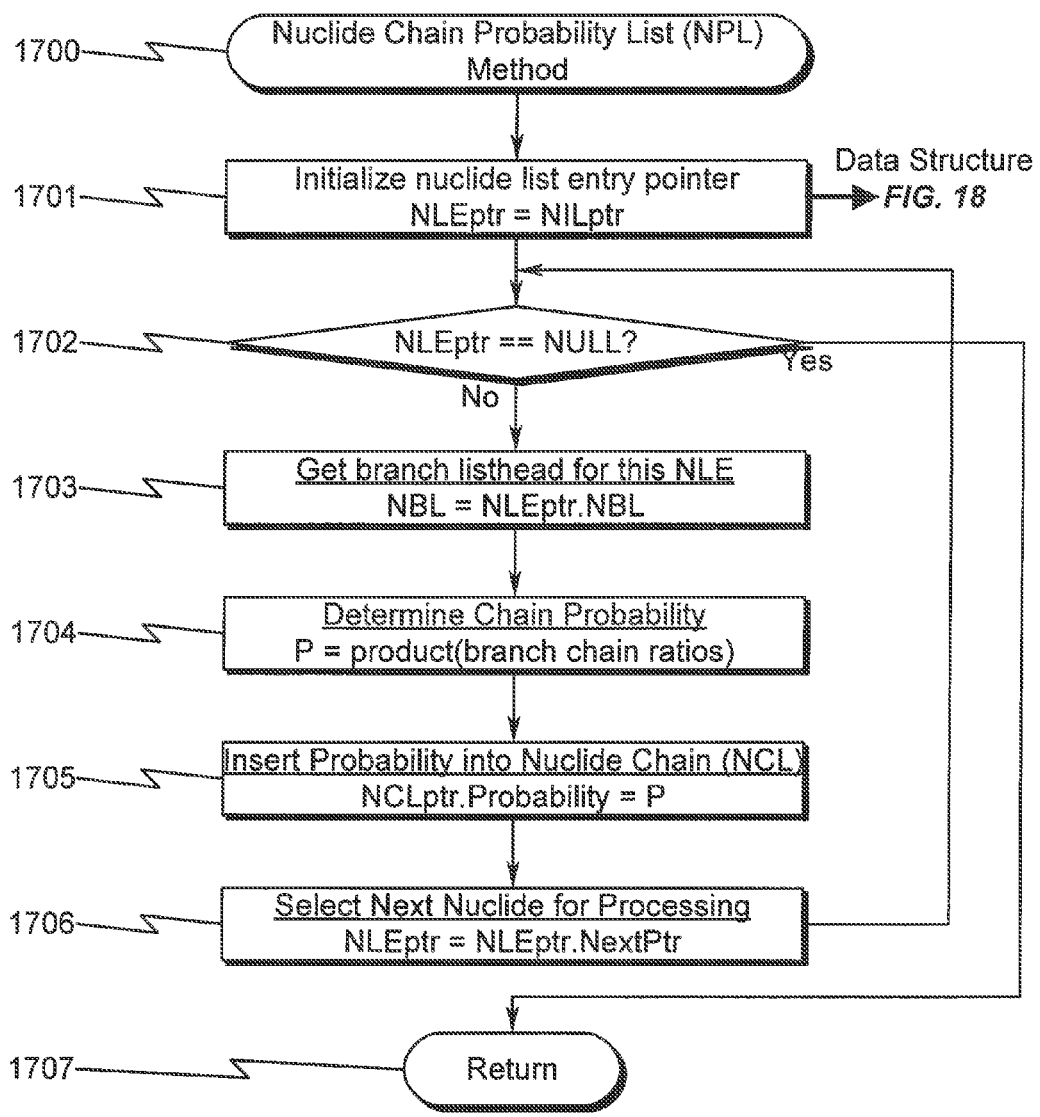
FIG. 17 illustrates a flowchart depicting a presently preferred invention embodiment method implementing a nuclide chain probability list (NPL) definition method.
Figure 18:
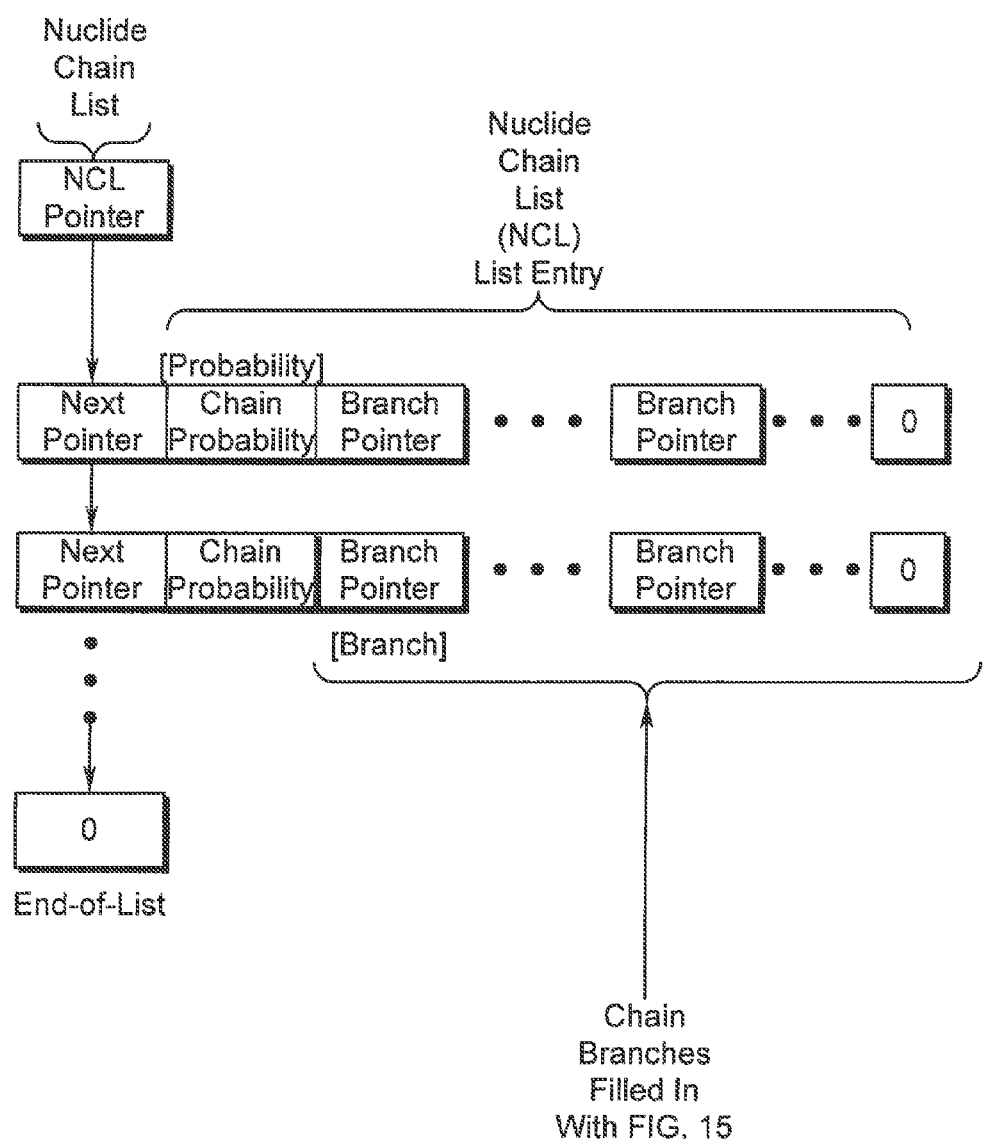
FIG. 18 illustrates a data structure associated with the flowchart of FIG. 17.

The generalized data structure associated with this method is provided in FIG. 10 (1000). Corresponding operational sub-modules referenced in FIG. 9 (0900) are provided in FIG. 11 (1100), FIG. 13 (1300), FIG. 15 (1500), and FIG. 17 (1700) with corresponding data structures created by the operational blocks depicted in FIG. 12 (1200), FIG. 14 (1400), FIG. 16 (1600), and FIG. 18 (1800). As depicted in FIG. 7 (0700) and FIG. 8 (0800), the potential number of nuclide decay chains is of order (N!) and thus the data structures represented in these figures (1000, 1200, 1400, 1600, 1800) may be quite large to account for the recursive permutations of nuclide branches and their associated energies and probabilities. As data is gathered from the radiation detectors, the TCS list is dynamically generated from the overall NIL data structure that is created based on measured energy levels and transition probabilities. This TCS list is then applied to the measured data from the radiation detectors to form a real-time count result that is displayed to an operator console.

Figure 15:
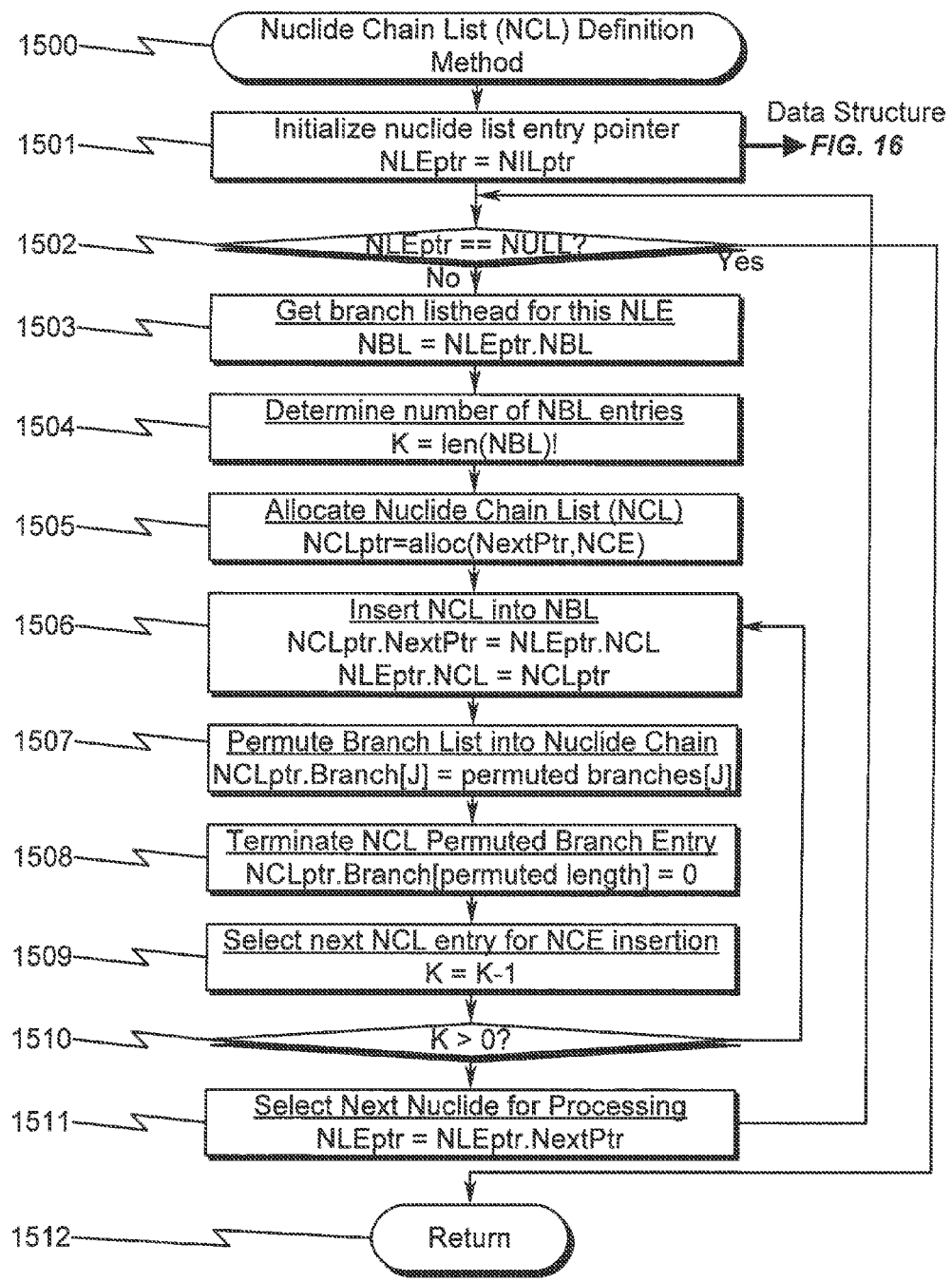
FIG. 15 illustrates a flowchart depicting a presently preferred invention embodiment method implementing a nuclide chain list (NCL) definition method.
Figure 16:
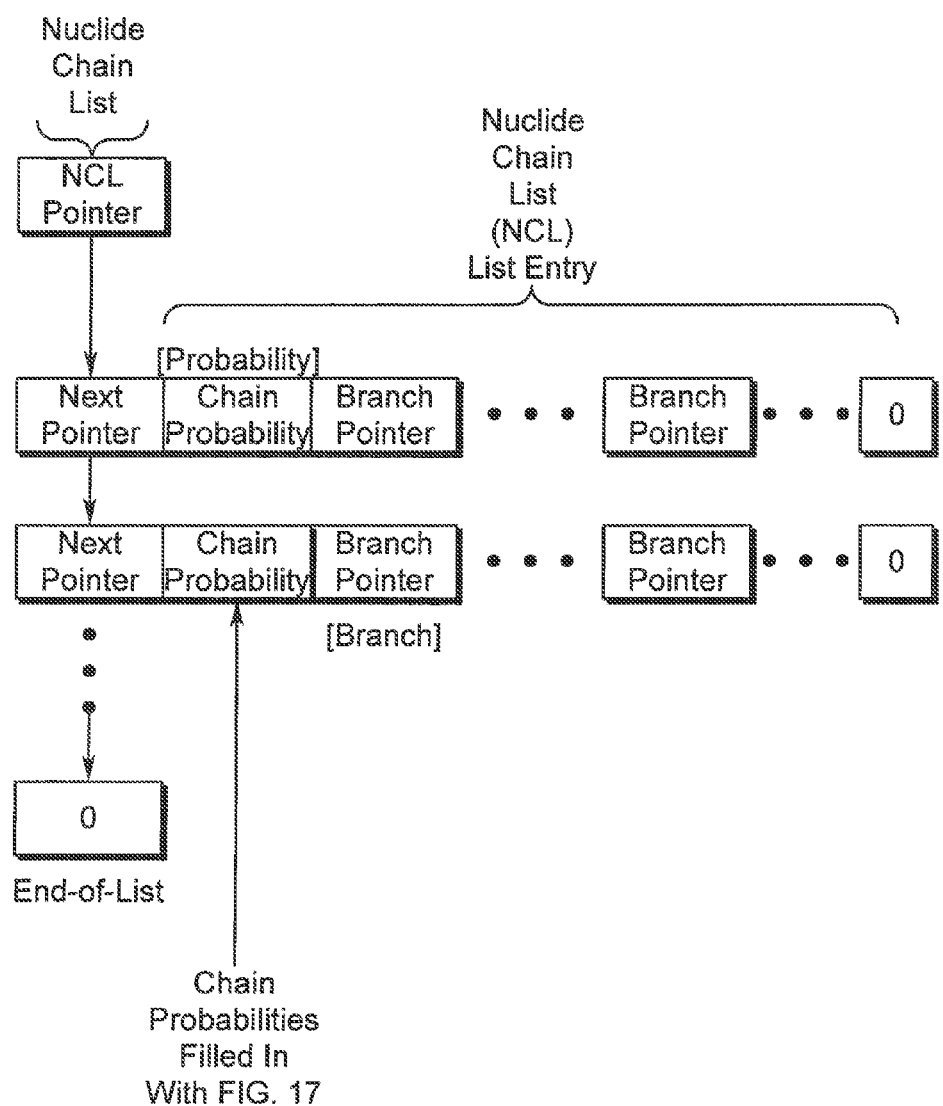
FIG. 16 illustrates a data structure associated with the flowchart of FIG. 15.

It should be noted that the recursive nuclide chain permutation depicted in FIG. 15 (1500) and FIG. 16 (1600) may be performed in a variety of ways depending on hardware implementation. Indexes may be iterated at each level of the nuclide branch list or a fully recursive procedure may be implemented. In either case, the resulting NCL is a list of nuclide chains each having an associated list of branch energy references.

Real-Time Processing (1900)-(2000)

Parallel Energy Matching Logic (0900)

Figure 19:
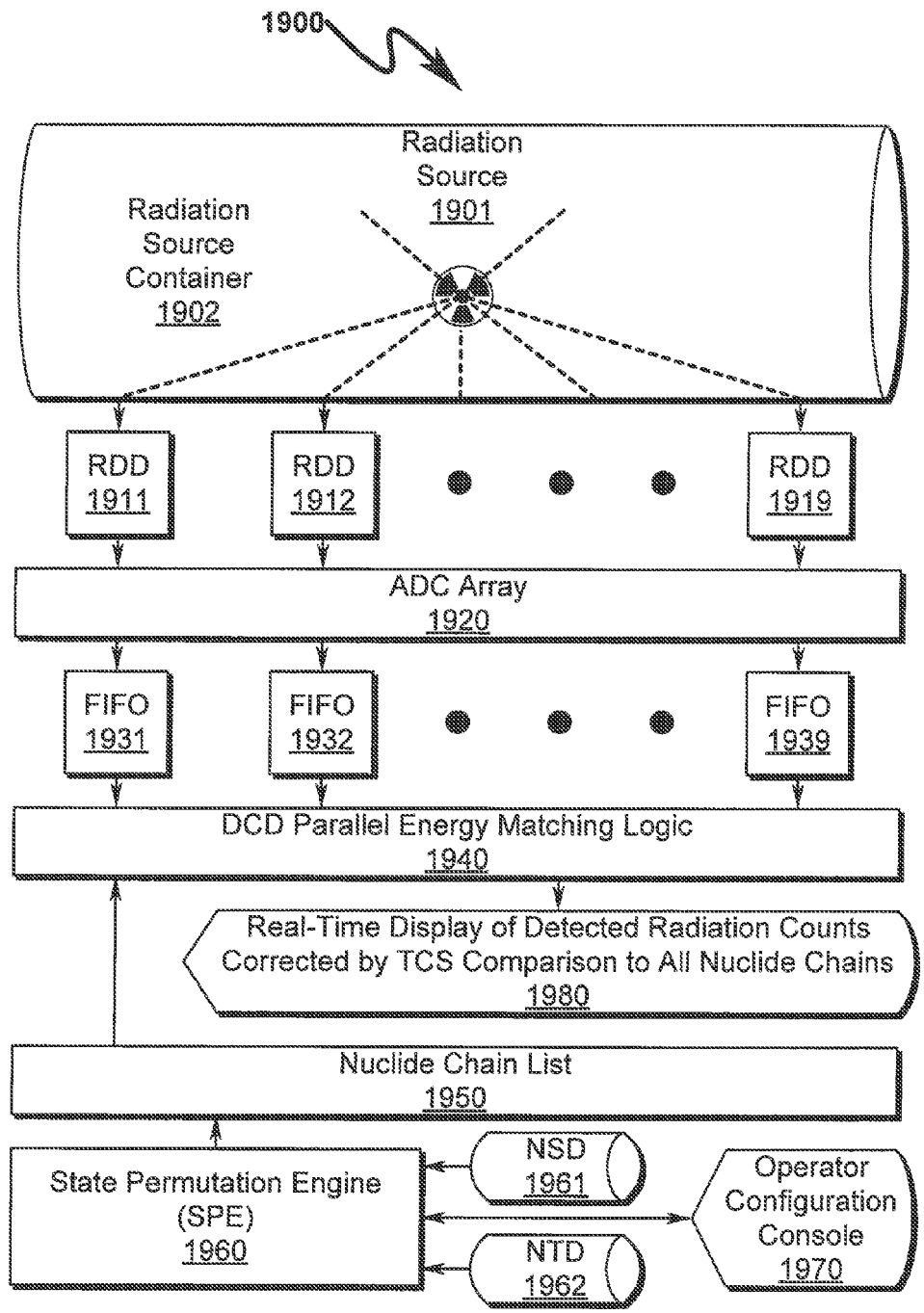
FIG. 19 illustrates an overview block diagram depicting a preferred invention system embodiment incorporating parallel energy matching of real-time radiation data with a dynamically generated nuclide chain list.

As discussed previously, the present invention targets real-time analysis of measured radiation data from a variety of radiation detection devices (RDD). As generally depicted in FIG. 19 (1900) in these scenarios the radiation source (1901) within the radiation source container (1902) emits radiation that is detected with one or more RDDs (1911, 1912, 1919) that are interfaced to a high speed ADC array (1920) that converts incoming analog detector information to digital. This digital data is streamed in real-time to FIFO memories (1931, 1932, 1939) for processing by DCD parallel energy matching logic (1940). This parallel matching logic (1940) compares in real-time the energy levels retrieved from the FIFOs (1931) with the nuclide chain list (NCL) (1950) previously generated by the state permutation engine (SPE) (1960) with input from the nuclide state database (NSD) (1961) and the nuclide transition database (NTD) (1962). The SPE (1960) in this context dynamically builds the NCL (1950) under real-time control of an operator configuration console (1970). Energy matches between the NCL (1950) and the FIFO data (1931, 1932, 1939) by the matching logic (1940) are presented on a display in real-time (1980). This real-time display (1980) may be integrated within or separate from the operator configuration console (1970).

Matching Logic Detail (2000)

Figure 20:
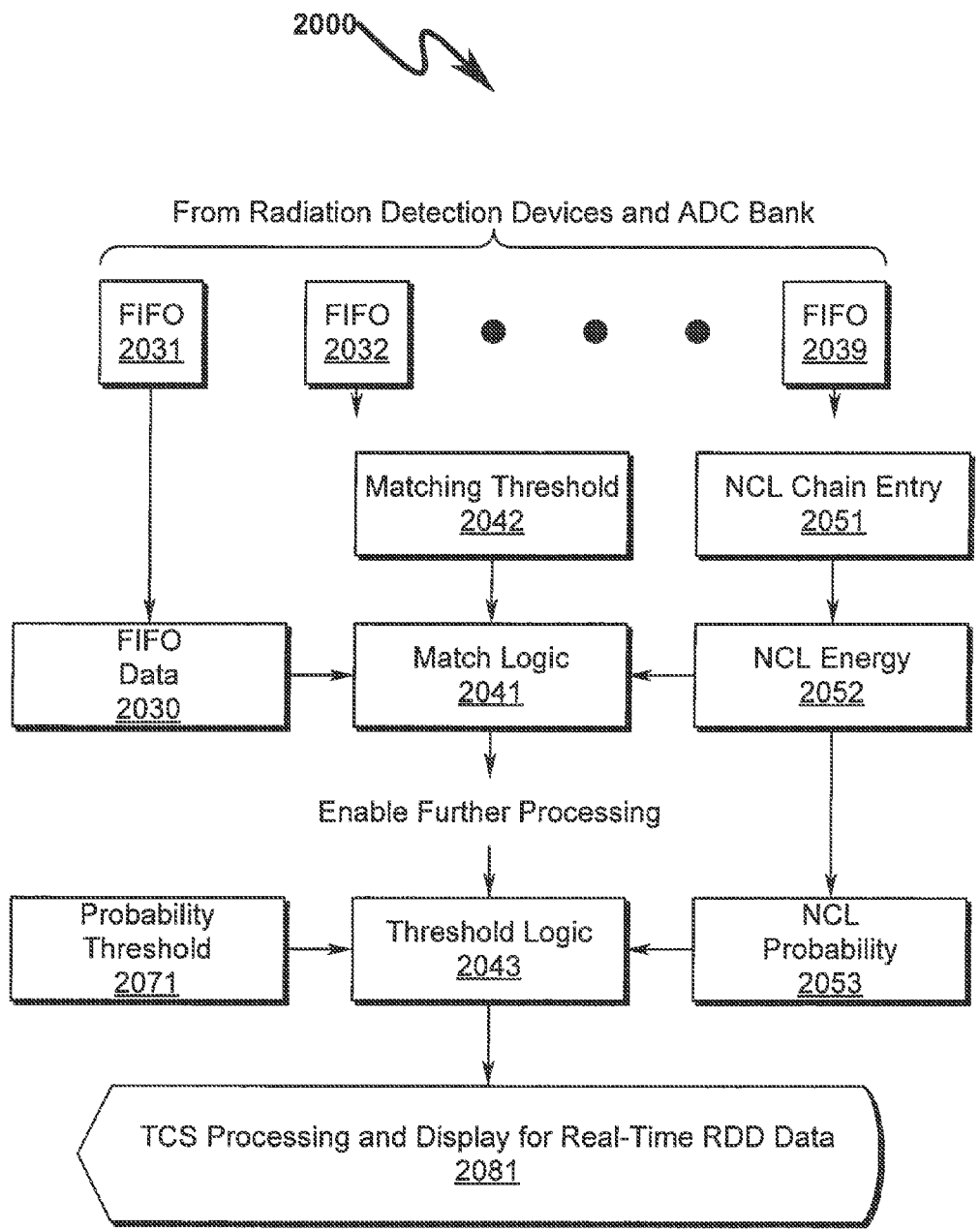
FIG. 20 illustrates a detail block diagram depicting a preferred invention system embodiment incorporating parallel energy matching of real-time radiation data with a dynamically generated nuclide chain list.

Additional detail of the DCD matching logic is depicted in FIG. 20 (2000) wherein the FIFOs (2031, 2032, 2039) is accepted by a FIFO data entry module (2030) and compared to NCL chain entry (2051) nuclide chain energy data (2052) by matching logic (2041) that compares the two entries to within a matching threshold register (2042) value. If the match logic (2041) is successful, this enables further processing is executed by a threshold logic (2043) function that compares a probability threshold (2071) against that from the NCL probability (2053). If the chain probability (2053) is above the probability threshold (2071), TCS processing logic (2081) is activated against the FIFO data to produce a real-time presentation of RDD data.

Theory of Operation (2100)-(2400)

Overview

Figure 21:
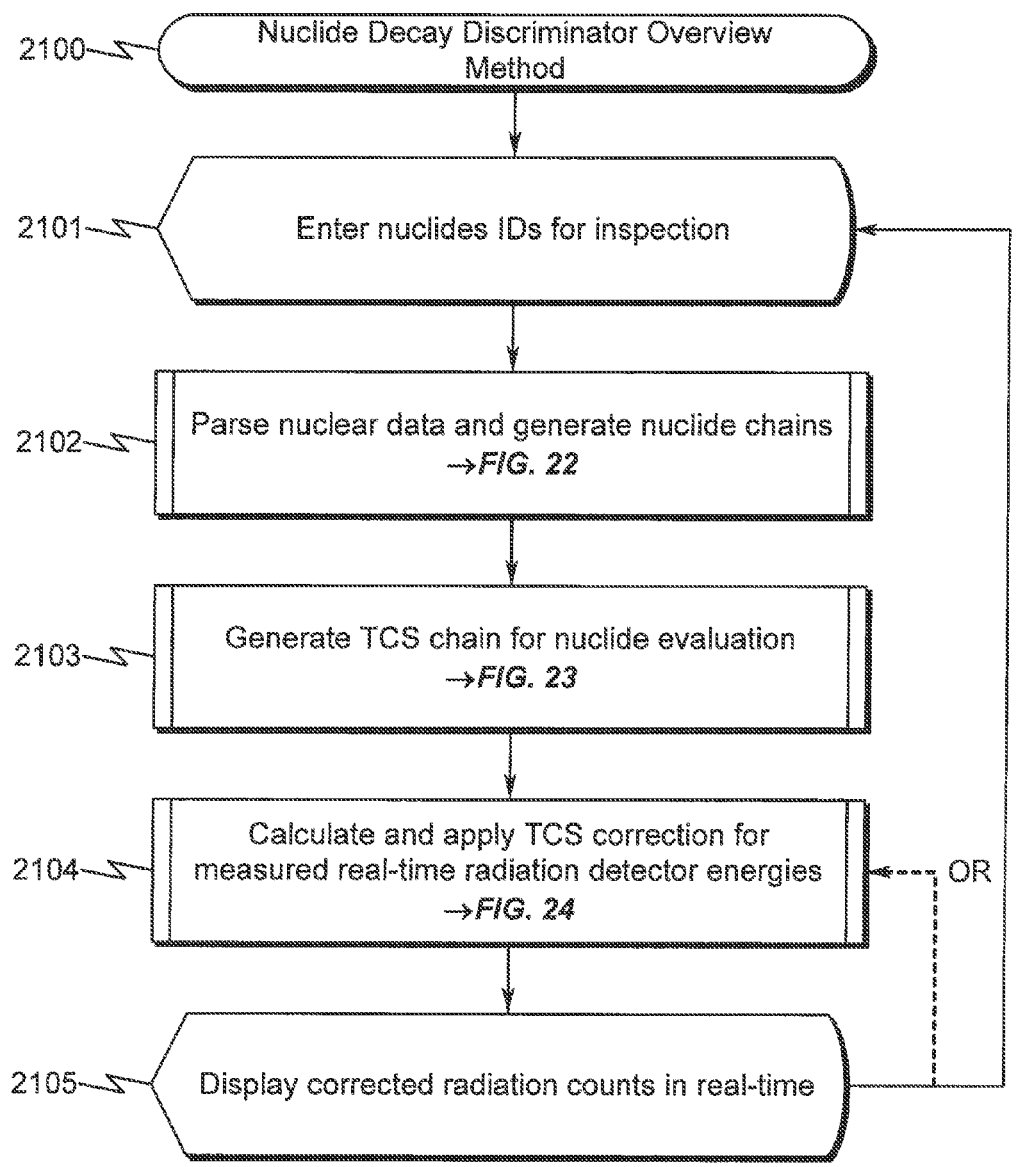
FIG. 21 illustrates an overview flowchart depicting an operational overview of the present invention.

An overview of the theory of operation may be seen in the flowchart of FIG. 21 (2100) wherein the major operational loop consists of the following steps:

(1) Enter nuclides IDs for inspection via an operator interface console (2101);
(2) Parsing nuclear data and generating nuclide chains (2102);
(3) Generate TCS chains for nuclide evaluation (2103);
(4) Calculating and applying TCS corrections for measured real-time radiation detector energies (2104);
(5) Displaying corrected radiation counts in real-time to an operator interface console (2105) and proceeding to step (1) or step (4).

This general operational loop may be heavily modified depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Multi-Photon Decay

Many radioactive nuclides emit more than one photon when they decay. These photons can either be gamma rays from the transitions in the daughter, X-rays from internal conversion, or electron capture or annihilation photons from positrons. When two or more photons are emitted within a time that is shorter than the resolution time of the detector they cannot be distinguished and will be summed by the detector. This is called True Coincidence Summing (TCS) because they are coincidences from the same initial decay. This will change the number of counts in the peaks and hence the activity determined from the spectrum. There are two categories of true cascade summing:

SUMMING OUT which is when the Full Energy Peak (FEP) is detected from a gamma ray and some energy is detected from any of the other photons emitted from the decay; and SUMMING IN when two or more photons depositing their full energies in the detector sum up to the Full Energy Peak (FEP) of another gamma ray and no energy is deposited from any other photons in the decay.

The first category reduces the number of counts in the Full Energy Peak (FEP) and the second category increases the number of counts in the Full Energy Peak (FEP).

Detailed Theory Description

Figure 22:
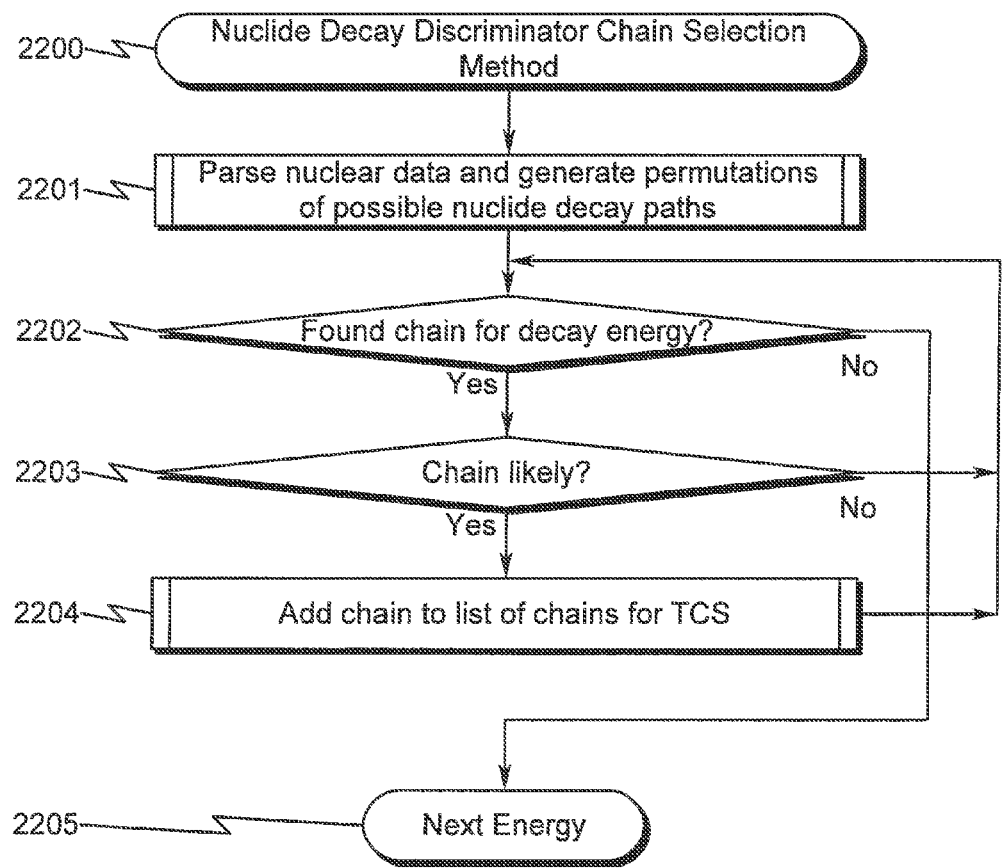
FIG. 22 illustrates a flowchart depicting an exemplary method for selecting which chains to include in the true coincidence summing correction factor.

While the present invention method may have a number of variations, the theory of operation of the basic invention process steps are described as follows. The first step is to parse nuclear structure data (e.g., as described in J. K. Tuli, EVALUATED NUCLEAR STRUCTURE DATA FILE (ENSDF), BNL-NCS-51655-01/02-Rev (2001); herein incorporated by reference) and generate all possible permutations of decay chains for the nuclide. Using the nuclide data it is possible to calculate the probability that the nuclide decays through the chain using the equation $$P = \beta \prod_{i=1}^{n} b_i \quad (4)$$

where $\beta$ is the probability that the nuclide decays to the highest excited state in the chain and $b_i$ is the branching ratio of the i-th transition in the chain. The probability of the chain is the upper limit of the contribution to the coincidence summing correction factor and if the probability of the chain, normalized to the total probability of the transition of interest, is lower than a threshold value, the chain is discarded. If the probability is larger than the threshold, the chain is added to the list of chains for the energy of interest. The selection is repeated for all energies for which the coincidence summing correction is to be calculated as depicted in the general flowchart of FIG. 22 (2200).

Figure 23:
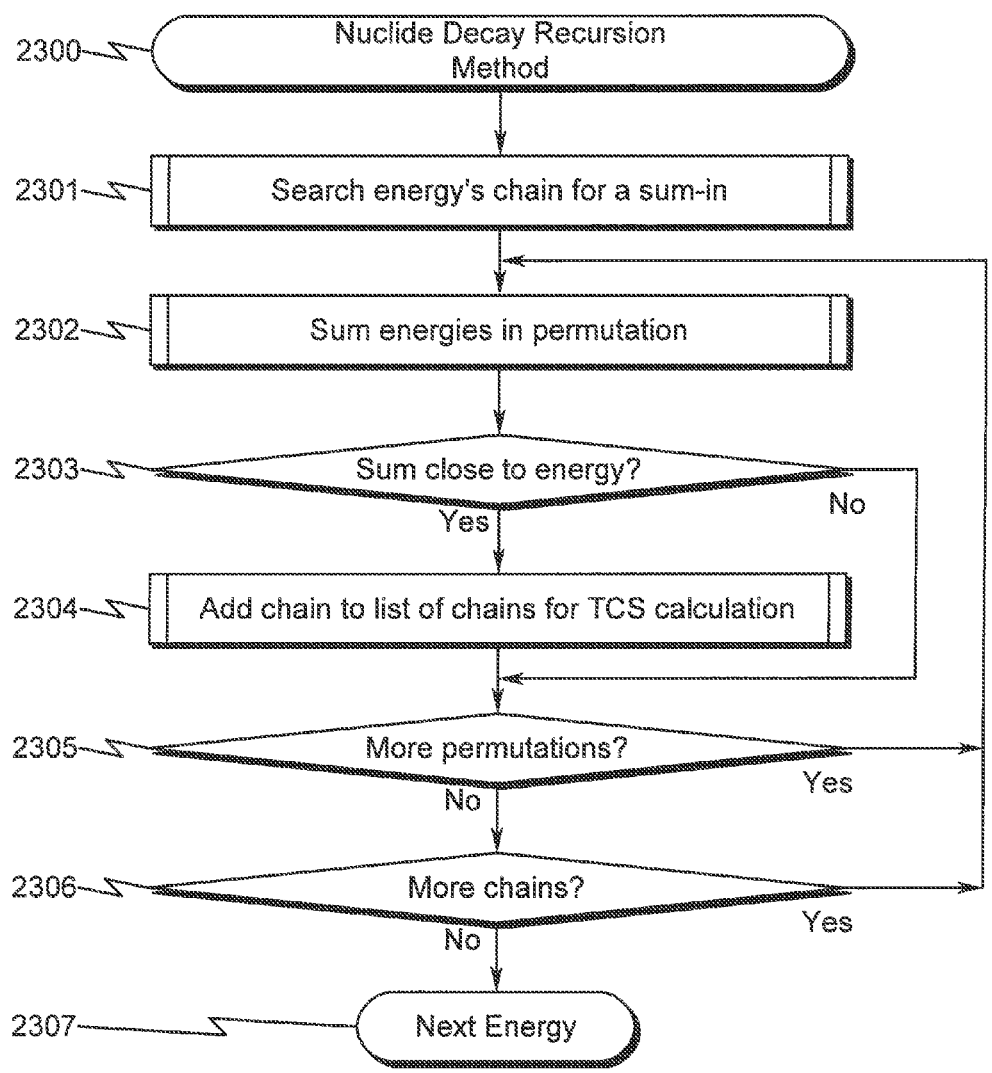
FIG. 23 illustrates a flowchart depicting an exemplary method for finding the sum within an energy chain.

The selection of sum-in chains to an energy of interest starts from the chains left after the low probability chains have been excluded. Each chain is searched for permutations of two or more photons; gamma, X-rays or annihilation photons that can add up to the energy of interest within a tolerance. This tolerance is adjusted based on the detector resolution. A sum-in chain is created if the sum of the energies are within the tolerance of the energy of interest; otherwise the next permutation is checked. After all the permutations are exhausted for a particular chain, the next chain is run through. This is repeated for all energies of interest as depicted in the general flowchart of FIG. 23 (2300).

When all chains summing-in to an energy in decay have been determined the chains are again searched for all combinations of two or more photons in a decay that have an emission probability higher than a threshold value. These chains are stored as sum-in to pure sum peaks. The information for the pure sum peaks are added to the nuclide fingerprint during the nuclide identification process.

Once all the sum-out and sum-in chains have been found, they can be stored for use later in their current form, converted into source code to be compiled so the TCS correction factor calculations can use parallel processing techniques, or calculate the TCS correction factors for the nuclide.

The TCS correction factor (COI), is calculated from the ratio of the probability that a photon of the energy of interest is detected alone by the detector if the detector has a non-perfect time resolution and the probability that a photon is detected by a detector with a perfect time resolution $C_p$, i.e, there is no true coincidence summing:

$$COI = \frac{C_P - C_{so} + C_{si}}{C_p} \quad (5)$$

where $C_{so}$ is the probability that a photon is summed out of the peak and $C_{si}$ is the probability that two or more photons are summed into the peak.

$C_p$ can, for a transition that occurs in n chains be expressed as $$C_p = c\varepsilon_p \sum_{i}^{n} P_i \quad (6)$$

Where c is the gamma emission probability for the transition.

The probability $P_{\gamma j}$ that a photon $\gamma_j$ is detected together with another photon from the same decay chain is $$P_{\gamma j} = c_j \varepsilon_{pj} \left[ 1 - \prod_{\substack{i=1 \\ i \neq j}}^{n} (1 - \varepsilon_{ti}) \right] \quad (7)$$

where $c_j$ is the gamma emission probability for the transition, $\varepsilon_{pj}$ is the Full Energy Peak (FEP) efficiency for $\gamma_j$ and $\varepsilon_{ti}$ is the probability that any energy is detected by the detector for the i-th transition (see M. Blaauw, Nucl. Inst. Meth. Phys. Res., A332 (1993) 493 and S. Agostinelli et al., Nucl. Inst. Meth. Phys. Res., A506 (2003) 250; both documents included herein by reference). $C_{so}$, the total probability for all chains can be calculated by summing Equation (7) and multiplying it with the probability that the chain occurs for all chains containing $\gamma_j$.

The probability that m photons deposit their full energy and no other photons in that decay chain deposits any energy $P_{\gamma\gamma}$ in the detector is given by $$P_{\gamma\gamma} = \left[ \prod_{j}^{m} (c_j \varepsilon_{pj}) \right] \left[ 1 - \prod_{\substack{i=1 \\ i \neq j}}^{n} (1 - \varepsilon_{ti}) \right] \quad (8)$$

(See M. Blaauw, Nucl. Inst. Meth. Phys. Res., A332 (1993) 493, herein incorporated by reference). Csi is calculated by summing all summing-in chains multiplied by the probability that the chain occurs, summing-in to $\gamma_j$.

From Equations (6)-(8) it can be seen that the Full Energy Peak (FEP) and total efficiencies are needed to calculate the correction, these quantities are the only quantities that are not known a priori. For volume sources, the peak and total efficiencies are needed for many points, and the correction factor is calculated by integrating over all source points in the sample.

For each chain it is possible to determine the minimum peak and/or total efficiency needed for the chain to have a non-negligible contribution to the correction factor.

For summing-in, Equation (8), it is enough if the probability of the chain multiplied by $c\varepsilon_p$ (where c is the gamma emission probability) for any of the photons summing-in to the energy of interest, is below a threshold value to be able to discard the chain for the source point.

For summing-out, Equation (7), it is required that the probability of the chain multiplied by $\varepsilon_t$ for all photons, except the photon of interest, are below the threshold for the chain to be discarded.

For the cases where m photons are emitted in the same decay with indistinguishable energies, the energy resolution of the detector is not good enough to distinguish between the energies, and the photons are emitted in the same decay Equations (6) becomes $$C_p = \sum_{j}^{m} c_j \varepsilon_{pj} \sum_{i}^{n} P_i \quad (9)$$

where n in this case is the number of chains where containing photons with indistinguishable energies.

The probability that one of the indistinguishable photons j and k were detected together with the any energy deposited from the other transitions in the decay $P_{\gamma j}$ is $$P_{\gamma j} = c_j \varepsilon_j [1 - (1 - (\varepsilon_{tk} - c_k \varepsilon_{pk}))] \sum_{\substack{i=1 \\ i \neq j,k}}^{n} (1 - \varepsilon_{ti}) +$$

$$c_k \varepsilon_{pk} \left[ 1 - (1 - (\varepsilon_{tj} - \varepsilon_{pj})) \prod_{\substack{i=1 \\ i \neq j,k}}^{n} (1 - \varepsilon_{ti}) \right] +$$

$$c_j \varepsilon_{pj} c_k \varepsilon_{pk} \left[ 1 - \prod_{\substack{i=1 \\ i \neq j,k}}^{n} (1 - \varepsilon_{ti}) \right] \quad (10)$$

Equation (10) can also be generalized to more than two indistinguishable photons.

For voluminous sources integration it is necessary to integrate the TCS correction factors from source points in the entire volume. (See V. Kolotov and V. Atrashkevich, TRUE COINCIDENCE SUMMING CORRECTION FOR RADIATION DETECTORS, U.S. Pat. No. 6,225,634 or L. Moens, et al., J. Radioanal. Nucl. Chem. 70 (1982) 539 herein incorporated by reference) derived how to do this for volumes where the point sources have equal weight. This can be extended to point sources with different weights. Weighted source points can be used for, but not limited to, non-uniform source distributions. For example, the activity concentration or density may vary over the source volume. Following the same derivation as described in V. Kolotov, V. Atrashkevich, "True coincidence summing correction for radiation detectors", U.S. Pat. No. 6,225,634 (herein incorporated by reference), the activity determined from a point source can be expressed as $$A = \frac{N_p}{\varepsilon \gamma} \quad (11)$$

where $N_p$ is the counts in the Full Energy Peak (FEP), $\varepsilon$ is the peak efficiency and $\gamma$ is the intensity of the gamma line. If the source is split up into n sub-sources the activity contribution from the i-th source with weight $w_i$ can be written as $$A_i = \frac{N_p w_i}{\varepsilon_i \gamma \sum_{j}^{n} w_j} \quad (12)$$

The count rate contribution from the i-th sub-source is then $$N_{p,i} = A_i \varepsilon_i \gamma \quad (13)$$

Inserting Equation (12) into Equation (13) yields $$N_{p,i} = \frac{N_p w_i \varepsilon_i}{\varepsilon \sum_{j=1}^{n} w_j} \quad (14)$$

If the count rate from the γ-ray is suffering from true coincidence summing, the observed peak count rate becomes $$N_{p,i,o} = \frac{N_p w_i \varepsilon_i}{\varepsilon COI_i \sum_{j=1}^{n} w_j} \quad (15)$$

where $COI_i$ is the true coincidence summing correction factor of the i-th subsample. The observed peak count rate can be calculated by summing over all sub-sources as follows:

$$N_{p,o} = \sum_{i=1}^{n} \frac{N_p \varepsilon_i w_i}{\varepsilon COI_i \sum_{j=1}^{n} w_j} \quad (16)$$

$$= \frac{N_p}{\varepsilon \sum_{j=1}^{n} w_j} \left[ \sum_{i=1}^{n} \frac{\varepsilon_i w_i}{COI_i} \right]$$

The true coincidence summing correction factor for the whole sample COI then becomes $$COI = \frac{N_p}{N_{p,o}} \quad (17)$$

$$= \frac{\varepsilon \sum_{j=1}^{n} w_j}{\sum_{i=1}^{n} \frac{\varepsilon_i w_i}{COI_i}}$$

Figure 24:
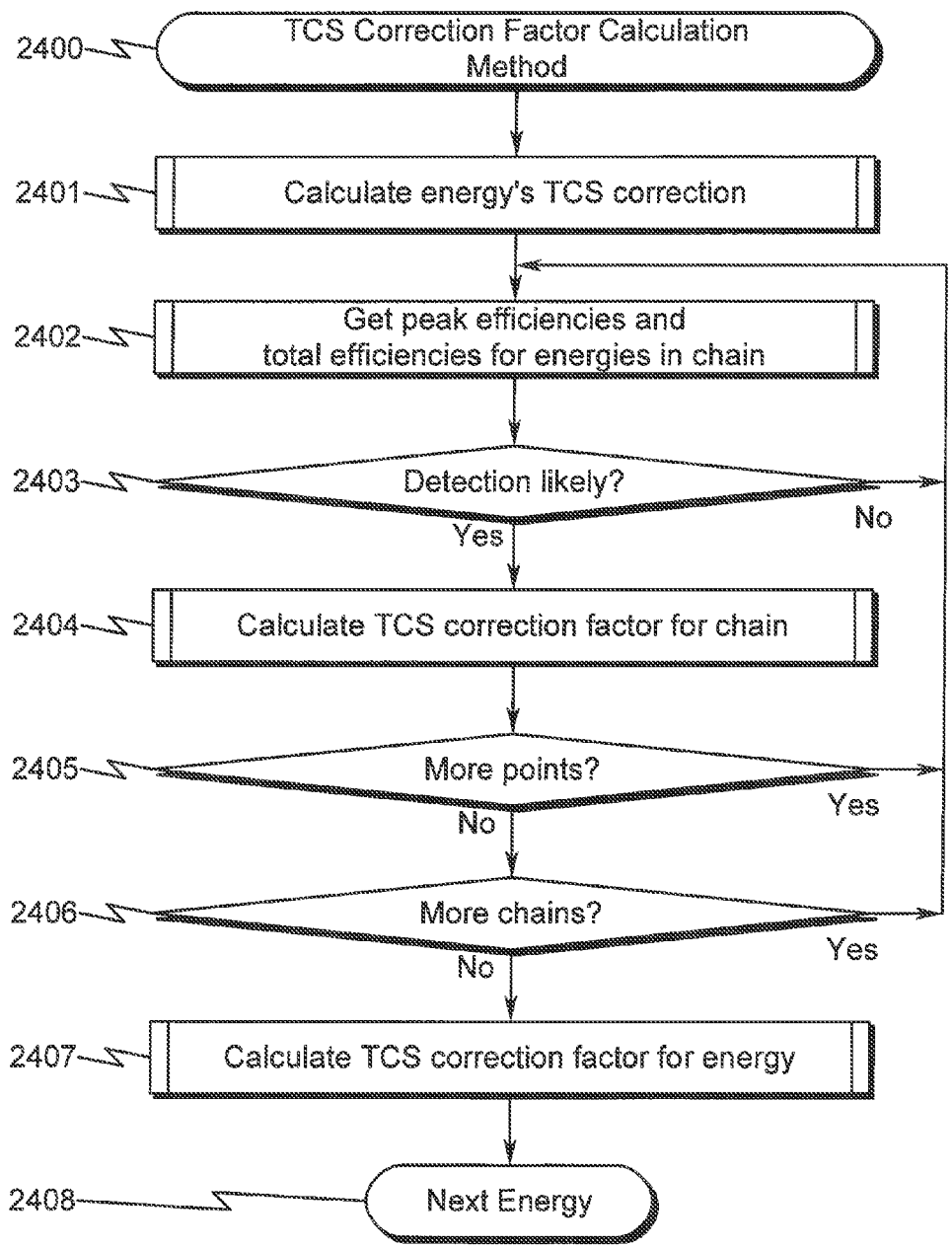
FIG. 24 illustrates a flowchart depicting an exemplary method for calculating the TCS correction factor from the pre-generated decay chains.

The flowchart depicted in FIG. 24 (2400) summarizes the calculation of the TCS correction factors.

True Coincidence Summing Example for $^{60}$Co

Overview (2500)

Figure 25:
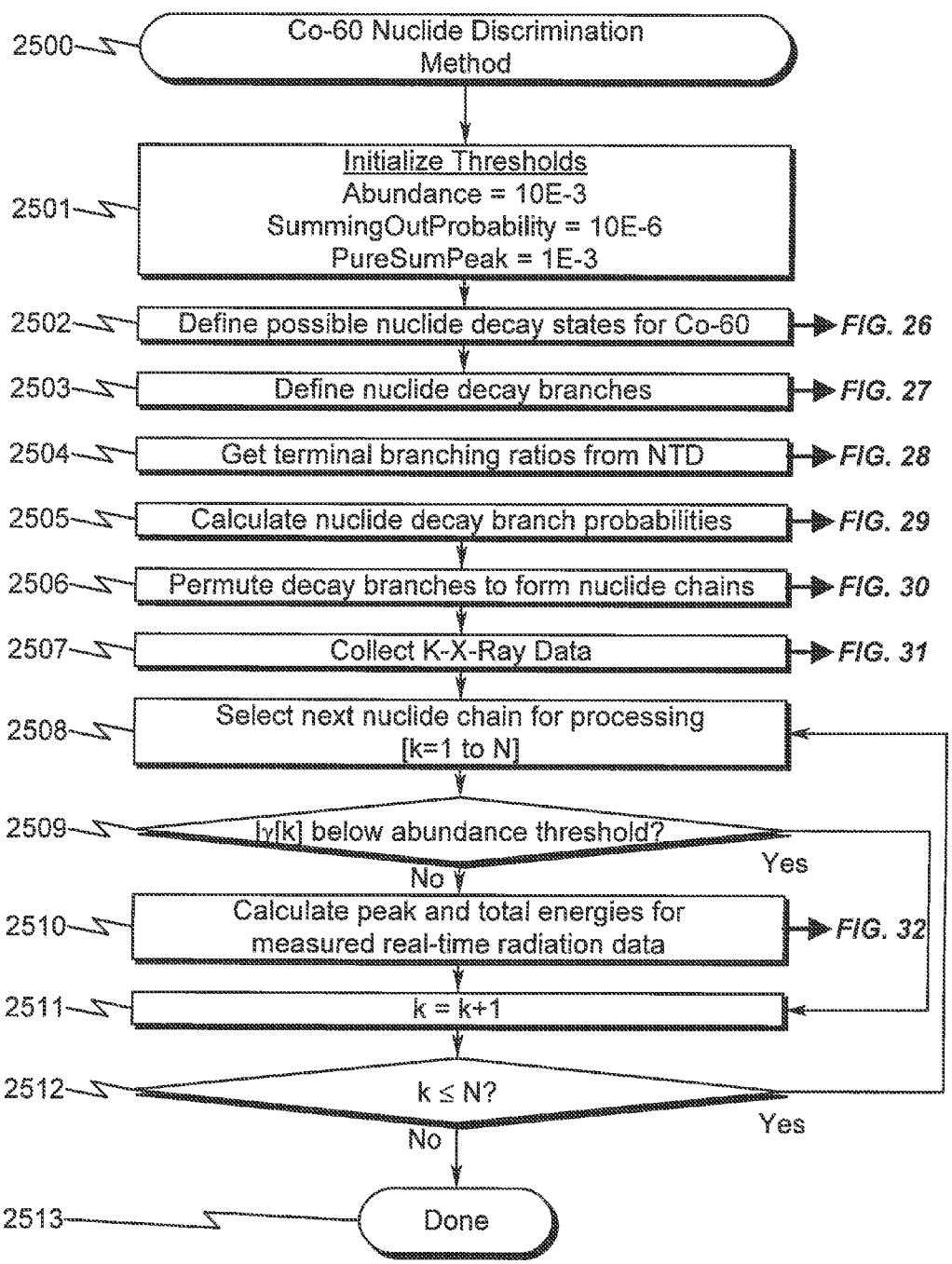
FIG. 25 illustrates a flowchart depicting the present invention teachings as applied to the implementation of a nuclide decay discriminator for $^{60}$Co decay.

The present invention will now be described in terms of an example in which the true coincidence summing techniques are applied to a $^{60}$Co nuclide decay discrimination scenario. FIG. 25 (2500) depicts the basic flowchart of operations required to perform this example and includes the following steps:

(1) Initializing thresholds for Abundance, SummingOut-Probability, and PureSumPeak (2501);
(2) Defining possible nuclide decay states for Co-60 (2502);
(3) Defining nuclide decay branches (2503);
(4) Retrieving terminal branching ratios from the NTD transition database (2504);
(5) Calculating nuclide decay branch probabilities (2505);
(6) Permuting the decay branches to form nuclide decay chains (2506);
(7) Collecting K-X-Ray Data (2507);
(8) Selecting the next nuclide chain for processing (2508);

(9) determining if Iγ[k] is below the abundance threshold, and if so, proceeding to step (11) (2509);
(10) Calculating peak and total energies for measured real-time radiation data using nuclide chain probabilities (2510);
(11) Incrementing the nuclide chain counter (k=k+1) (2511);
(12) Determining if the nuclide chain counter is less than or equal to the number of nuclide chains, and if so, proceeding to step (8) (2512); and
(13) terminating the nuclide decay discriminator method (2513).

These stops are further detailed below.

$^{60}$Co Decay

Figure 26:
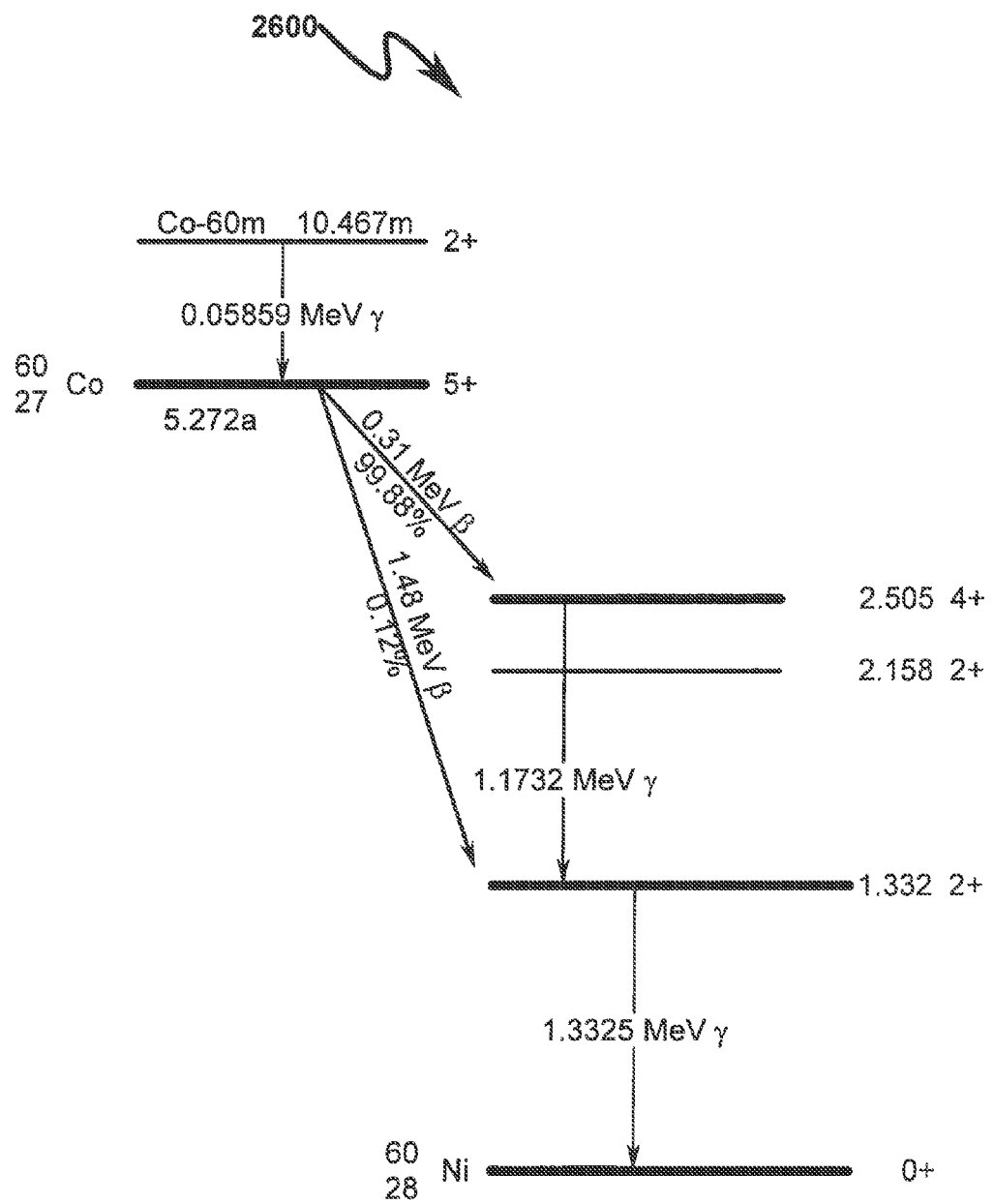
FIG. 26 illustrates a general overview of $^{60}$Co decay.

FIG. 26 (2600) shows a (simplified) decay scheme of $^{60}$Co and 60mCo. The main β-decay transitions are shown. The probability for population of the middle energy level of 2.1 MeV by β-decay is 0.0022%, with a maximum energy of 665.26 keV. Energy transfers between the three levels generate six different gamma-ray energies. As depicted in FIG. 26 (2600) the two important ones are marked.

60mCo is a nuclear isomer of $^{60}$Co with a half-life of 10.467 minutes. It decays by internal transition to $^{60}$Co, emitting 58.6 keV gamma rays, or with a low probability (0.22%) by β-decay into $^{60}$Ni.

Cobalt-60 ($^{60}$Co) decays by β$^-$ emission to an excited state in $^{60}$Ni which decays by photon emission to the stable ground state.

TCS Correction Factor Operational Parameters

This section describes how the True Coincidence Summing (TCS) correction factor is calculated using the method described herein for a volumetric source that can be represented as two point sources with weight 1. The following thresholds are used in this example:

ABUNDANCE THRESHOLD (10E-3)—The minimum ratio of Iγ and the maximum gamma intensity for any transition for which the TCS correction is calculated for;
SUMMING OUT PROBABILITY THRESHOLD (10E-6)—The minimum probability for a chain to be used in the calculation of the sum-out probability; and
PURE SUM PEAK (1E-3)—The minimum probability for a chain to be used in the search for pure sum peaks.

Figure 27:
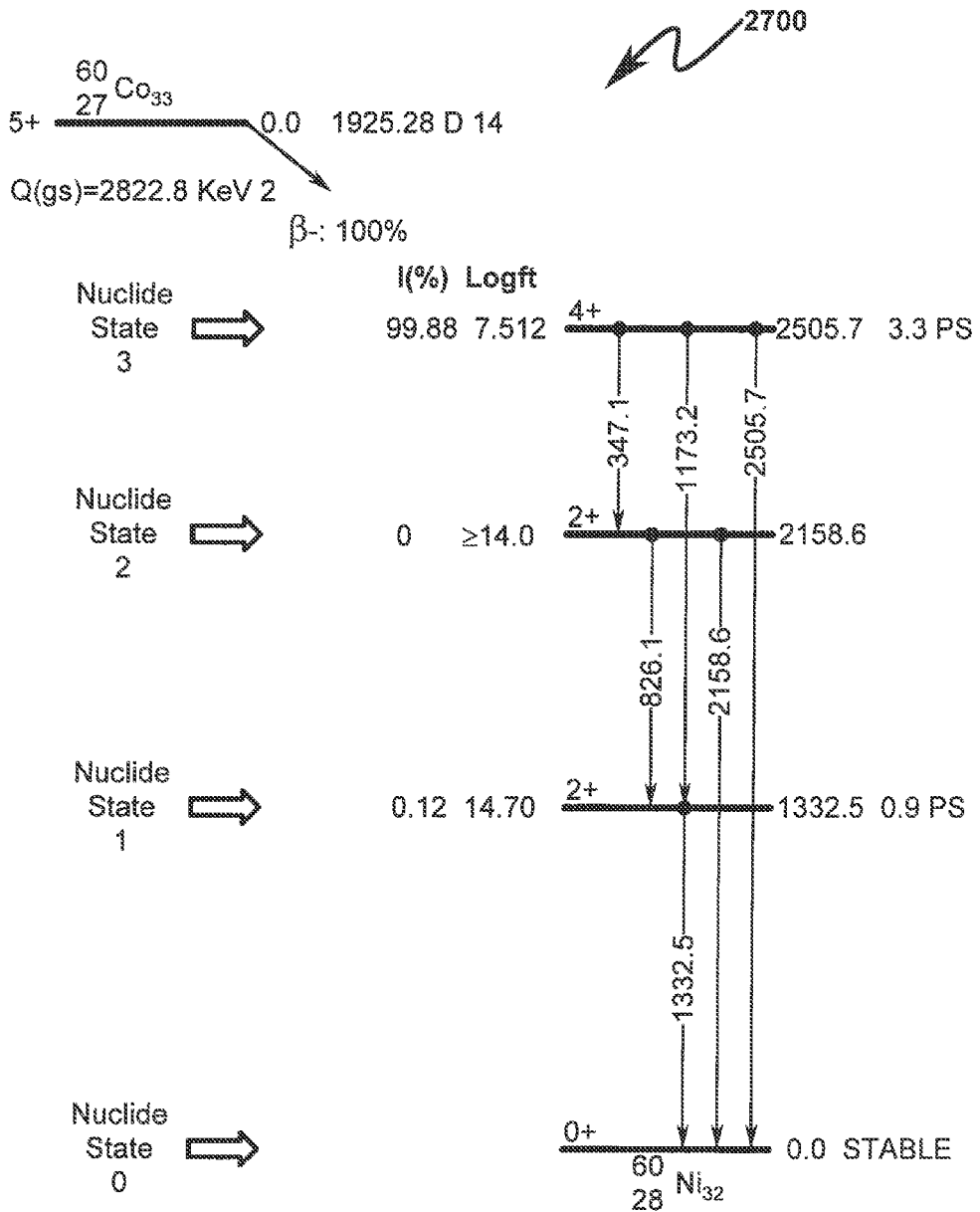
FIG. 27 illustrates a detail overview of $^{60}$Co decay.
Figure 28:
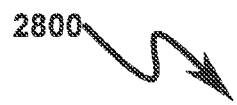
FIG. 28 illustrates a table of final states and branching ratios for the decay of $^{60}$Co.

The decay of $^{60}$Co used in this example can be seen in FIG. 27 (2700). The main decay branch is to the third excited state with a small fraction decaying to the first excited state. The two most common photon emissions are the 1173 keV and 1332 keV gamma rays. The nuclear data needed for the method are summarized in tables provided in FIG. 28 (2800) and FIG. 29 (2900).

Nuclide Transition Branching Ratio

The branching ratio for a transition can be calculated from $$P_i = \frac{I_{\gamma,i}(1+\alpha)}{\sum_j I_{\gamma,j}(1+\alpha)},\quad (18)$$

where $I_{\gamma,i}$ is the gamma intensity from the i-th state and the α is the internal conversion coefficient and the summation is done over all transitions originating from the same state as Transition i.

Combining the nuclear data it is possible to build the decay chains listed in the table depicted in FIG. 30 (3000).

Figure 31:
FIG. 31 illustrates a table of K-X-Ray data for $^{60}$Co.

The K-X-ray data is summarized in the table depicted in FIG. 31 (3100). K-X-ray florescence yield a $\omega_k$ value of 0.406.

From the table depicted in FIG. 29 (2900) it can be seen that the $I_\gamma$ is below the ABUNDANCE THRESHOLD for Transitions 1, 2, 5, and 6 and the TCS correction factor is only to be calculated for Transitions 3 and 4.

The peak and total efficiencies for all energies of interest for the two point sources that can be used to represent the volumetric source is listed in the table depicted in FIG. 32 (3200).

Transition 3

Transition 3 is present in chains number 3 and 5. The probability that a photon from Transition 3 deposits its full energy in the detector is $$C_p = \frac{(\beta_3^- P_3 P_4 + \beta_1^- P_3)\varepsilon_{p,3}}{1+\alpha_3} = 0.9998\varepsilon_{p,3} \quad (19)$$

where $\varepsilon_{p,3}$ is the Full Energy Peak (FEP) efficiency of the photon emitted from Transition 3.

The probability to observe the photon from Transition 3 together with any other photon is $$C_{so} = \frac{\beta_3^- P_3 P_4 \varepsilon_{p,3}}{1+\alpha_3}[1-(1-\varepsilon_4)] \quad (20)$$
$$= 0.9986\varepsilon_{p,3}\varepsilon_4$$

where $$\varepsilon_4 = \frac{\varepsilon_{4,t} + \alpha_{k4}\sum_i b_i \varepsilon_{i,t}}{1+\alpha_4} \quad (21)$$

and $b_i$ is the emission probability of the i-th K-X-ray and $\varepsilon_{i,t}$ is the total efficiency of the i-th K-X-ray. Since there is only one photon emitted in chain 5 there is no summing out contribution from it.

Checking the sum of all the combinations of transition energies and x-ray energies reveals that the sum of Transition 1 and 2 are within the sum tolerance and the summing-in probability can be expressed as $$C_{si} = \frac{\beta_3^- P_1 P_2 P_4 \varepsilon_{p,1} \varepsilon_{p,2}}{1+\alpha_3}[1-(1-\varepsilon_4)] \quad (22)$$
$$= 0.0000653\varepsilon_{p,1}\varepsilon_{p,2}\varepsilon_4$$

The TCS correction factor for Transition 3 can then be expressed as $$COI = \frac{C_p - C_{so} - C_{si}}{C_p} \quad (23)$$

Applying the efficiencies for the two point sources in to Equation (23) gives the COI factors 0.874 and 0.919 for the two point sources and combining them using the equation $$COI = \frac{\varepsilon_p \sum_j w_j}{\sum_i \frac{\varepsilon_{p,i} w_i}{COI_i}} \quad (24)$$

gives the total COI factor as 0.893.

Transition 4

Transition 4 is present in chain number 1 and 3. However the probability that chain 1 occurs is below the SUMMING OUT PROBABILITY THRESHOLD and its contribution to the COI factor can be neglected. The probability that a photon from Transition 4 deposits its full energy in the detector is $$C_p = \frac{\beta_3^- P_3 P_4 \varepsilon_{p,4}}{1 + \alpha_4} \quad (25)$$
$$= 0.9986 \varepsilon_{p,4}$$

where $\varepsilon_{p,4}$ is the Full Energy Peak (FEP) efficiency of the photon emitted from Transition 4.

The probability to observe the photon from Transition 4 together with any other photon is $$C_{so} = \frac{\beta_3^- P_3 P_4 \varepsilon_{p,4}}{1 + \alpha_4}[1 - (1 - \varepsilon_3)] \quad (26)$$
$$= 0.9986 \varepsilon_{p,4} \varepsilon_3$$

No combination of transition energies or K-X-ray energies adds up to the energy of Transition 4 within the sum tolerance.

The TCS correction factor for Transition 4 can then be expressed as $$COI_i = \frac{C_P - C_{so}}{C_p}. \quad (27)$$

Applying the efficiencies for the two point sources in to Equation (2727) gives the COI factors 0.869 and 0.915 for the two point sources and combining them using the equation $$COI = \frac{\varepsilon \sum_j w_j}{\sum_i \frac{\varepsilon_i w_i}{COI_i}} \quad (28)$$

gives the total COI factor as 0.886.

Pure Sum Peaks

Combining the transition energies and K-X-ray energies (for the chains that have higher probability than the minimum sum probability) and having a sum that is not within the sum tolerance of a Transition that have a COI factor is calculated for reveals that the only pure sum peak that survives is the sum of Transitions 3 and 4. Although the sum is within the sum tolerance for Transition 6 the low $I_\gamma$ causes this peak to be regarded as a pure sum peak.

The probability that Transitions 3 and 4 both emit photons and the full energy is deposited by both photons is $$P_{3,4} = \frac{\beta_3^- P_3 P_4 \varepsilon_{p,3} \varepsilon_{p,4}}{(1 + \alpha_3)(1 + \alpha_4)} \quad (29)$$

Applying the peak efficiencies for the two point sources the probability is 0.000951 and 0.000396 for the two point sources respectively.

Combining the two probabilities using the equation $$P_{sum} = \frac{\sum_i P_{3,4,i} w_i}{\sum_j w_j} \quad (30)$$
$$= 0.000673$$

yields the probability that a count is registered in the peak at 2505 keV per decay of $^{60}$Co.

SUMMARY

The above discussion describes how the TCS correction factors and the pure sum peak probabilities are calculated with the recursive true coincidence summing correction system/method implemented within various embodiments of the present invention.

Typical Application Context

While a variety of application contexts for the present invention are anticipated, some are preferred. One such preferred application context is in radiation safeguard measurement equipment that is generally categorized into three groups:

Portable equipment;
Attended in-situ (or installed) equipment; and
Unattended installed equipment.

Portable equipment is carried or shipped for a single inspection while in-situ equipment is installed permanently at a facility. Unattended equipment is installed in a facility and operates continually to monitor movement of nuclear material in the absence of inspection personnel. Both the attended in-situ and unattended installed equipment often serve a dual purpose function because they are used by the inspection agency for international safeguards and the member state for domestic safeguards.

Within these application contexts, several known portable radiation detection systems include the U-Pu InSpector, the IMCA, and the JSR-14 systems. All of these prior art systems combine automatic control of acquisition electronics and rapid analysis with an integrated software package for ease of use. The U-Pu InSpector incorporates the MGA code used by the IAEA and Euratom for plutonium analysis. The IMCA complies with IAEA PMCN and PMCG procedures for uranium analysis. The JSR-14 is a portable neutron coincidence counter that complies with the IAEA neutron counting procedures.

The gamma spectrometry systems described above are used to determine the isotopic abundances of the special nuclear materials. When the isotopic information is combined with the results from a neutron coincidence counter, it is possible to establish the total special nuclear material content of the sample for safeguard accountability purposes. A calorimeter measures the heat output of the sample and can also be used in conjunction with the isotopic measurement results to determine the total special nuclear material mass for accountability purposes. There are several situations where a calorimeter is preferable to a neutron coincidence counter for this purpose.

The present invention may in some preferred embodiments be integrated within these existing radiation detection systems to improve the overall detection and nuclide discrimination capabilities of these systems

System Summary

The present invention system anticipates a wide variety of variations in the basic theme of construction, but can be generalized as a nuclide decay discriminator system comprising:
  (a) radiation detection device (RDD);
  (b) analog-to-digital converter (ADC);
  (c) digital computing device (DCD);
  (d) operator interface console (OIC);
  (e) real-time display (RTD);
  (f) nuclide state database (NSD);
  (g) transition probability database (TPD); and
  (h) state permutation engine (SPE);
  wherein
  the RDD is configured to detect radiation and produce an analog electrical signal corresponding to the detection of a radiation event;
  the RDD is configured to electrically couple the analog electrical signal to the ADC;
  the ADC is configured to convert the analog signal to digital radiation data (DRD) representing the presence of detected radiation in the RDD;
  the DCD is configured to count occurrences of the DRD that are above a predetermined energy detection threshold (EDT) to produce a radiation detection count (RDC);
  the DCD is configured to accept via the OTC a nuclide inspection list (NIL);
  the DCD is configured to retrieve nuclide state information (NSI) from the NSD that defines the possible states of nuclides within the NIL;
  the DCD is configured to use the NSI to define nuclide state branches (NSB) that define transitions between states listed in the NSI;
  the DCD is configured to associate a state transition probability (STP) for each of the NSB by retrieving a probability associated with the NSB from the TPD;
  the DCD is configured to recursively permute the NSB using the SPE to form a nuclide state chain (NSC) list associated with each of the nuclides within the NIL;
  the DCD is configured to compute an overall nuclide chain probability (NCP) for each NSC;
  the DCD is configured to generate a nuclide probable decay chain (PDC) list from the NSC by including in the PDC only chains in the NSC having a NCP above a predetermined threshold;
  the DCD is configured to associate a detected energy level in the DRD with entries in the PDC to produce a detected nuclide decay (DND) list;
  the DCD is configured to display the DND list to the RTD for review by an operator in real-time; and
  the DCD is configured to display the RDC associated with entries in the RTD for review by the operator in real-time.

This general system summary may be augmented by the various elements described herein to produce a wide variety of invention embodiments consistent with this overall design description.

Method Summary

The present invention method anticipates a wide variety of variations in the basic theme of implementation, but can be generalized as a nuclide decay discriminator method comprising:
  (1) with a radiation detection device (RDD), detecting radiation and producing an analog electrical signal corresponding to the detection of a radiation event;
  (1) with the RDD, electrical coupling the analog electrical signal to an analog-to-digital converter (ADC);
  (2) with the ADC, converting the analog signal to digital radiation data (DRD) representing the presence of detected radiation in the RDD;
  (3) with a digital computing device (DCD), counting occurrences of the DRD that are above a predetermined energy detection threshold (EDT) to produce a radiation detection count (RDC);
  (4) with the DCD, accepting via an operator interface console (OIC) a nuclide inspection list (NIL);
  (5) with the DCD, retrieving nuclide state information (NSI) from a nuclide state database (NSD) that defines the possible states of nuclides within the NIL;
  (6) with the DCD, using the NSI to define nuclide state branches (NSB) that define transitions between states listed in the NSI;
  (7) with the DCD, associating a state transition probability (STP) for each of the NSB by retrieving a probability associated with the NSB from a transition probability database (TPD);
  (8) with the DCD, recursively permuting the NSB using a state permutation engine (SPE) to form a nuclide state chain (NSC) list associated with each of the nuclides within the NIL;
  (9) with the DCD, computing an overall nuclide chain probability (NCP) for each NSC;
  (10) with the DCD, generating a nuclide probable decay chain (PDC) list from the NSC by including in the PDC only chains in the NSC having a NCP above a predetermined threshold;
  (11) with the DCD, associating a detected energy level in the DRD with entries in the PDC to produce a detected nuclide decay (DND) list;
  (12) with the DCD, displaying the DND list to a real-time display (RTD) for review by an operator in real-time; and
  (13) with the DCD, displaying the RDC associated with entries in the RTD for review b the operator in real-time.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
  An embodiment wherein the RDD comprises a photon detector.
  An embodiment wherein the RDD is configured to detect alpha, beta, and gamma radiation.

An embodiment wherein the SPE is configured to recursively permute (N+1) total nuclide states into (N!) nuclide decay chains.

An embodiment wherein the DCD generates N(N−1)/2 of the NSB for a nuclide having (N+1) total nuclide states.

An embodiment wherein the DCD is configured to perform parallel hardware processing of the DRD with entries in the PDC to produce the DND list.

An embodiment wherein the DCD uses relative peak sizes of the DRD to identify nuclides using X-ray-X-ray sum peaks, gamma-X-ray sum peaks, gamma-gamma sum peaks, and gamma-annihilation photon sum peaks.

An embodiment wherein the DCD is configured to generate a nuclide probable decay chain (PDC) list from the NSC by including in the PDC only chains in the NSC having a NCP above a predetermined threshold by calculating the minimum efficiency for each nuclide chain, on a point by point basis, to determine if the nuclide chain has a non-negligible impact on the coincidence summing factor (COI).

An embodiment wherein the DCD computes the NCP using a true coincidence summing (TCS) correction factor (COI) that is calculated from the ratio of the probability that a photon of the energy of interest is detected alone by the RDD if the RDD has a non-perfect time resolution and the probability that a photon is detected by the RDD with a perfect time resolution $C_p$ with no true coincidence summing using the formula:

$$COI = \frac{C_P - C_{so} + C_{si}}{C_p}$$

wherein $C_{so}$ is the probability that a photon is summed out of the peak and $C_{si}$ is the probability that two or more photons are summed into the peak.

An embodiment wherein the DCD is configured to calculate sum peaks from a plurality of photons.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks, thumb drives, and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A nuclide decay discriminator system and method has been disclosed. The system utilizes a digital computing device (DCD) to capture radiation counts from a radiation detection device (RDD) such as a photon detector via the use of one or more integrated analog-to-digital converters (ADC). The radiation count information is then processed using a recursive procedure in the DCD that determines the desired nuclide to be evaluated and then defines the possible nuclide decay transition states. For each possible nuclide decay state, a recursive permutation of possible state transitions from this nuclide state is determined using a state permutation engine (SPE). Combinations of these state transition branches are linked to form state transition chains each having individual probabilities associated with the overall state transition chain. These state transition chain probabilities are applied to the RDD ADC data to form observed RDD radiation data radiation count probabilities and displayed in real-time.

DOCUMENTS INCLUDED BY REFERENCE

The following documents are included herein by reference:
H. Zhu, et al., TRUE COINCIDENCE SUMMING CORRECTION AND TOTAL EFFICIENCY COMPUTATION FOR RADIONUCLIDE SPECTROSCOPY ANALYSIS, U.S. Pat. No. 8,227,761.
V. Kolotov, V. Atrashkevich, TRUE COINCIDENCE SUMMING CORRECTION FOR RADIATION DETECTORS, U.S. Pat. No. 6,225,634.
L. Moens, et al., J. Radioanal. Nucl. Chem. 70 (1982) 539.
F. De Corte, The k0-Standardization Method: A Move to the Optimization of Reactor Neutron Activation Analysis, Habil. Thesis, University of Gent, Belgium, 1987.
M. Blaauw, Nucl. Inst. Meth. Phys. Res., A332 (1993) 493.
M. Blaauw, Nucl. Inst. Meth. Phys. Res., A505 (2003) 311.
R. Keyser, "The evaluation of true coincidence effect on CTBTO-type sample geometry", The 2003 IEEE Nuclear Science Symposium and Medical Imaging Conference, Portland, Oreg., Oct. 19-25, 2003.
D. Arnold and O. Sima, Applied Radiation and Isotopes 60 (2004) 167.
T. Vidmar et al, Applied Radiation and Isotopes 69 (2011) 908
S Agostinelli et al., Nucl. Inst. Meth. Phys. Res., A506 (2003) 250.
A. N. Berlizov, Applied Modeling and Computations in Nuclear Science, chapter 13 183-194 ACS Symposium Series, Vol. 945, (2006).
J. K. Tuli, EVALUATED NUCLEAR STRUCTURE DATA FILE (ENSDF), BNL-NCS-51655-01/02-Rev (2001).

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. §112(f) and such claim shall be construed to cover the corresponding structure, material, or acts described in the specification and equivalents thereof.

The phrase "MEANS FOR" specifically invokes the means-plus-function claims limitation recited in 35 U.S.C. §112(f) and such claim shall be construed to cover the corresponding structure, material, or acts described in the specification and equivalents thereof.

The phrase "STEP FOR" specifically invokes the step-plus-function claims limitation recited in 35 U.S.C. §112(f) and such claim shall be construed to cover the corresponding structure, material, or acts described in the specification and equivalents thereof.

The phrase "AND/OR" in the context an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:
1. A nuclide decay discriminator system comprising:
(a) radiation detection device (RDD);
(b) analog-to-digital converter (ADC);
(c) digital computing device (DCD);
(d) operator interface console (OIC);
(e) real-time display (RTD);
(f) nuclide state database (NSD);
(g) transition probability database (TPD); and
(h) state permutation engine (SPE);
wherein
said RDD is configured to detect radiation and produce an analog electrical signal corresponding to the detection of a radiation event;
said RDD is configured to electrically couple said analog electrical signal to said ADC;
said ADC is configured to convert said analog signal to digital radiation data (DRD) representing the presence of detected radiation in said RDD;
said DCD is configured to count occurrences of said DRD that are above a predetermined energy detection threshold (EDT) to produce a radiation detection count (RDC);
said DCD is configured to accept via said OIC a nuclide inspection list (NIL);
said DCD is configured to retrieve nuclide state information (NSI) from said NSD that defines the possible states of nuclides within said NIL;
said DCD is configured to use said NSI to define nuclide state branches (NSB) that define transitions between states listed in said NSI;
said DCD is configured to associate a state transition probability (STP) for each of said NSB by retrieving a probability associated with said NSB from said TPD;
said DCD is configured to recursively permute said NSB using said SPE to form a nuclide state chain (NSC) list associated with each of said nuclides within said NIL;
said DCD is configured to compute an overall nuclide chain probability (NCP) for each said NSC;
said DCD is configured to generate a nuclide probable decay chain (PDC) list from said NSC by including in said PDC only chains in said NSC having a NCP above a predetermined threshold;
said DCD is configured to associate a detected energy level in said DRD with entries in said PDC to produce a detected nuclide decay (DND) list;
said DCD is configured to display said DND list to said RTD for review by an operator in real-time; and
said DCD is configured to display said RDC associated with entries in said RTD for review by said operator in real-time.

2. The nuclide decay discriminator system of claim 1 wherein said RDD comprises a photon detector.

3. The nuclide decay discriminator system of claim 1 wherein said RDD is configured to detect alpha, beta, and gamma radiation.

4. The nuclide decay discriminator system of claim 1 wherein said SPE is configured to recursively permute (N+1) total nuclide states into (N!) nuclide decay chains;
wherein:
for each of said nuclides within said NIL, said N represents a count of non-terminal energy levels in said nuclide within said NIL.

5. The nuclide decay discriminator system of claim 1 wherein said DCD generates $$\frac{N \times (N-1)}{2}$$

of said NSB for a nuclide having (N+1) total nuclide states;
wherein:
for each of said nuclides within said NIL, said N represents a count of non-terminal energy levels in said nuclide within said NIL.

6. The nuclide decay discriminator system of claim 1 wherein said DCD is configured to perform parallel hardware processing of said DRD with entries in said PDC to produce said DND list.

7. The nuclide decay discriminator system of claim 1 wherein said DCD uses relative peak sizes of said DRD to identify nuclides using X-ray-X-ray sum peaks, gamma-X-ray sum peaks, gamma-gamma sum peaks, and gamma-annihilation photon sum peaks.

8. The nuclide decay discriminator system of claim 1 wherein said DCD is configured to generate a nuclide probable decay chain (PDC) list from said NSC by including in said PDC only chains in said NSC having a NCP above a predetermined threshold by calculating the minimum efficiency for each nuclide chain, on a point by point basis, to determine if the nuclide chain has a non-negligible impact on the coincidence summing factor (COI).

9. The nuclide decay discriminator system of claim 1 wherein said DCD computes said NCP using a true coincidence summing (TCS) correction factor (COI) that is calculated from the ratio of the probability that a photon of the energy of interest is detected alone by said RDD if said RDD has a non-perfect time resolution and the probability that a photon is detected by said RDD with a perfect time resolution $C_p$ with no true coincidence summing using the formula:

$$COI = \frac{C_P - C_{so} + C_{si}}{C_p}$$

wherein $C_{so}$ is the probability that a photon is summed out of the peak and $C_{si}$ is the probability that two or more photons are summed into the peak.

10. The nuclide decay discriminator system of claim 1 wherein said DCD is configured to calculate sum peaks from a plurality of photons.

11. A nuclide decay discriminator method comprising:
(1) with a radiation detection device (RDD), detecting radiation and producing an analog electrical signal corresponding to the detection of a radiation event;
(2) with said RDD, electrically coupling said analog electrical signal to an analog-to-digital converter (ADC);
(3) with said ADC, converting said analog signal to digital radiation data (DRD) representing the presence of detected radiation in said RDD;
(4) with a digital computing device (DCD), counting occurrences of said DRD that are above a predetermined energy detection threshold (EDT) to produce a radiation detection count (RDC);
(5) with said DCD, accepting via an operator interface console (OIC) a nuclide inspection list (NIL);
(6) with said DCD, retrieving nuclide state information (NSI) from a nuclide state database (NSD) that defines the possible states of nuclides within said NIL;
(7) with said DCD, using said NSI to define nuclide state branches (NSB) that define transitions between states listed in said NSI;
(8) with said DCD, associating a state transition probability (STP) for each of said NSB by retrieving a probability associated with said NSB from a transition probability database (TPD);
(9) with said DCD, recursively permuting said NSB using a state permutation engine (SPE) to form a nuclide state chain (NSC) list associated with each of said nuclides within said NIL;
(10) with said DCD, computing an overall nuclide chain probability (NCP) for each said NSC;
(11) with said DCD, generating a nuclide probable decay chain (PDC) list from said NSC by including in said PDC only chains in said NSC having a NCP above a predetermined threshold;
(12) with said DCD, associating a detected energy level in said DRD with entries in said PDC to produce a detected nuclide decay (DND) list;
(13) with said DCD, displaying said DND list to a real-time display (RTD) for review by an operator in real-time; and
(14) with said DCD, displaying said RDC associated with entries in said RTD for review by said operator in real-time.

12. The nuclide decay discriminator method of claim 11 wherein said RDD comprises a photon detector.

13. The nuclide decay discriminator method of claim 11 wherein said RDD is configured to detect alpha, beta, and gamma radiation.

14. The nuclide decay discriminator method of claim 11 wherein said SPE is configured to recursively permute (N+1) total nuclide states into (N!) nuclide decay chains;
wherein:
for each of said nuclides within said NIL, said N represents a count of non-terminal energy levels in said nuclide within said NIL.

15. The nuclide decay discriminator method of claim 11 wherein said DCD generates $$\frac{N \times (N-1)}{2}$$

of said NSB for a nuclide having (N+1) total nuclide states;
wherein:
for each of said nuclides within said NIL, said N represents a count of non-terminal energy levels in said nuclide within said NIL.

16. The nuclide decay discriminator method of claim 11 wherein said DCD is configured to perform parallel hardware processing of said DRD with entries in said PDC to produce said DND list.

17. The nuclide decay discriminator method of claim 11 wherein said DCD uses relative peak sizes of said DRD to identify nuclides using X-ray-X-ray sum peaks, gamma-X-ray sum peaks, gamma-gamma sum peaks, and gamma-annihilation photon sum peaks.

18. The nuclide decay discriminator method of claim 11 wherein said DCD is configured to generate a nuclide probable decay chain (PDC) list from said NSC by including in said PDC only chains in said NSC having a NCP above a predetermined threshold by calculating the minimum efficiency for each nuclide chain, on a point by point basis, to determine if the nuclide chain has a non-negligible impact on the coincidence summing factor (COI).

19. The nuclide decay discriminator method of claim 11 wherein said DCD computes said NCP using a true coincidence summing (TCS) correction factor (COI) that is calculated from the ratio of the probability that a photon of the energy of interest is detected alone by said RDD if said RDD has a non-perfect time resolution and the probability that a photon is detected by said RDD with a perfect time resolution $C_p$ with no true coincidence summing using the formula:

$$COI = \frac{C_P - C_{so} + C_{si}}{C_p}$$

wherein $C_{so}$ is the probability that a photon is summed out of the peak and $C_{si}$ is the probability that two or more photons are summed into the peak.

20. The nuclide decay discriminator method of claim 11 wherein said DCD is configured to calculate sum peaks from a plurality of photons.

21. A tangible non-transitory computer usable medium having computer-readable program code means embodied thereon comprising a nuclide decay discriminator method comprising:
(1) with a radiation detection device (RDD), detecting radiation and producing an analog electrical signal corresponding to the detection of a radiation event;
(2) with said RDD, electrically coupling said analog electrical signal to an analog-to-digital converter (ADC);
(3) with said ADC, converting said analog signal to digital radiation data (DRD) representing the presence of detected radiation in said RDD;
(4) with a digital computing device (DCD), counting occurrences of said DRD that are above a predetermined energy detection threshold (EDT) to produce a radiation detection count (RDC);
(5) with said DCD, accepting via an operator interface console (OIC) a nuclide inspection list (NIL);
(6) with said DCD, retrieving nuclide state information (NSI) from a nuclide state database (NSD) that defines the possible states of nuclides within said NIL;
(7) with said DCD, using said NSI to define nuclide state branches (NSB) that define transitions between states listed in said NSI;
(8) with said DCD, associating a state transition probability (STP) for each of said NSB by retrieving a probability associated with said NSB from a transition probability database (TPD);
(9) with said DCD, recursively permuting said NSB using a state permutation engine (SPE) to form a nuclide state chain (NSC) list associated with each of said nuclides within said NIL;
(10) with said DCD, computing an overall nuclide chain probability (NCP) for each said NSC;
(11) with said DCD, generating a nuclide probable decay chain (PDC) list from said NSC by including in said PDC only chains in said NSC having a NCP above a predetermined threshold;
(12) with said DCD, associating a detected energy level in said DRD with entries in said PDC to produce a detected nuclide decay (DND) list;
(13) with said DCD, displaying said DND list to a real-time display (RTD) for review by an operator in real-time; and
(14) with said DCD, displaying said RDC associated with entries in said RTD for review by said operator in real-time.

22. The computer usable medium of claim 21 wherein said RDD comprises a photon detector.

23. The computer usable medium of claim 21 wherein said RDD is configured to detect alpha, beta, and gamma radiation.

24. The computer usable medium of claim 21 wherein said SPE is configured to recursively permute (N+1) total nuclide states into (N!) nuclide decay chains;
wherein:
for each of said nuclides within said NIL, said N represents a count of non-terminal energy levels in said nuclide within said NIL.

25. The computer usable medium of claim 21 wherein said DCD generates $$\frac{N \times (N-1)}{2}$$

of said NSB for a nuclide having (N+1) total nuclide states;
wherein:
for each of said nuclides within said NIL, said N represents a count of non-terminal energy levels in said nuclide within said NIL.

26. The computer usable medium of claim 21 wherein said DCD is configured to perform parallel hardware processing of said DRD with entries in said PDC to produce said DND list.

27. The computer usable medium of claim 21 wherein said DCD uses relative peak sizes of said DRD to identify nuclides using X-ray-X-ray sum peaks, gamma-X-ray sum peaks, and gamma-annihilation photon sum peaks.

28. The computer usable medium of claim 21 wherein said DCD is configured to generate a nuclide probable decay chain (PDC) list from said NSC by including in said PDC only chains in said NSC having a NCP above a predetermined threshold by calculating the minimum efficiency for each nuclide chain, on a point by point basis, to determine if the nuclide chain has a non-negligible impact on the coincidence summing factor (COI).

29. The computer usable medium of claim 21 wherein said DCD computes said NCP using a true coincidence summing (TCS) correction factor (COI) that is calculated from the ratio of the probability that a photon of the energy of interest is detected alone by said RDD if said RDD has a non-perfect time resolution and the probability that a photon is detected by said RDD with a perfect time resolution $C_p$ with no true coincidence summing using the formula:

$$COI = \frac{C_P - C_{so} + C_{si}}{C_p}$$

wherein $C_{so}$ is the probability that a photon is summed out of the peak and $C_{si}$ is the probability that two or more photons are summed into the peak.

30. The computer usable medium of claim 21 wherein said DCD is configured to calculate sum peaks from a plurality of photons.

* * * * *